United States Patent [19]

Ando

[11] Patent Number: 5,008,946
[45] Date of Patent: Apr. 16, 1991

[54] SYSTEM FOR RECOGNIZING IMAGE

[75] Inventor: Mitsuhiro Ando, Tokyo, Japan

[73] Assignee: Aisin Seiki K.K., Tokyo, Japan

[21] Appl. No.: 242,441

[22] Filed: Sep. 9, 1988

[30] Foreign Application Priority Data

Sep. 9, 1987 [JP] Japan .................................. 62-225862

[51] Int. Cl.$^5$ .............................................. G06K 9/00
[52] U.S. Cl. ........................................ 382/2; 382/23; 382/24; 434/43; 180/271; 180/167
[58] Field of Search .......................... 382/2, 1, 23, 24; 340/825.03; 358/103; 434/62, 43, 44; 244/222, 76 R, 194, 195, 3.11, 3.14; 414/901; 180/167, 272, 271

[56] References Cited

U.S. PATENT DOCUMENTS

| 3,638,188 | 1/1972 | Pincoffs et al. | 382/23 |
|---|---|---|---|
| 4,281,734 | 8/1981 | Johnston | 180/167 |
| 4,479,784 | 10/1984 | Mallinson et al. | 434/43 |
| 4,625,329 | 11/1986 | Ishikawa et al. | 180/271 |

OTHER PUBLICATIONS

Nakasi Honda et al., Multivariate Data Representation and Analysis by Face Pattern Using Facial Expression Characteristics, 6-1985, 85-93.

Primary Examiner—Michael Razavi
Attorney, Agent, or Firm—Sughrue, Mion, Zinn, Macpeak & Seas

[57] ABSTRACT

There is disclosed a system which permits an automobile driver to control electrical devices installed on an automobile by moving his or her pupils and mouth intentionally. The system includes a TV camera, a light, a first microprocessor which controls the electrical devices according to the changes in the shape of the driver's mouth, a second microprocessor for performing various arithmetic operations, and memories. Reference values have been previously assigned to various elements of the driver's face and stored in one of the memories. The second microprocessor normalizes the distances between the elements of the face with the distance between the pupils of the eyes and compares the normalized distances with the reference values to calculate the degrees of similarity of the elements.

1 Claim, 22 Drawing Sheets

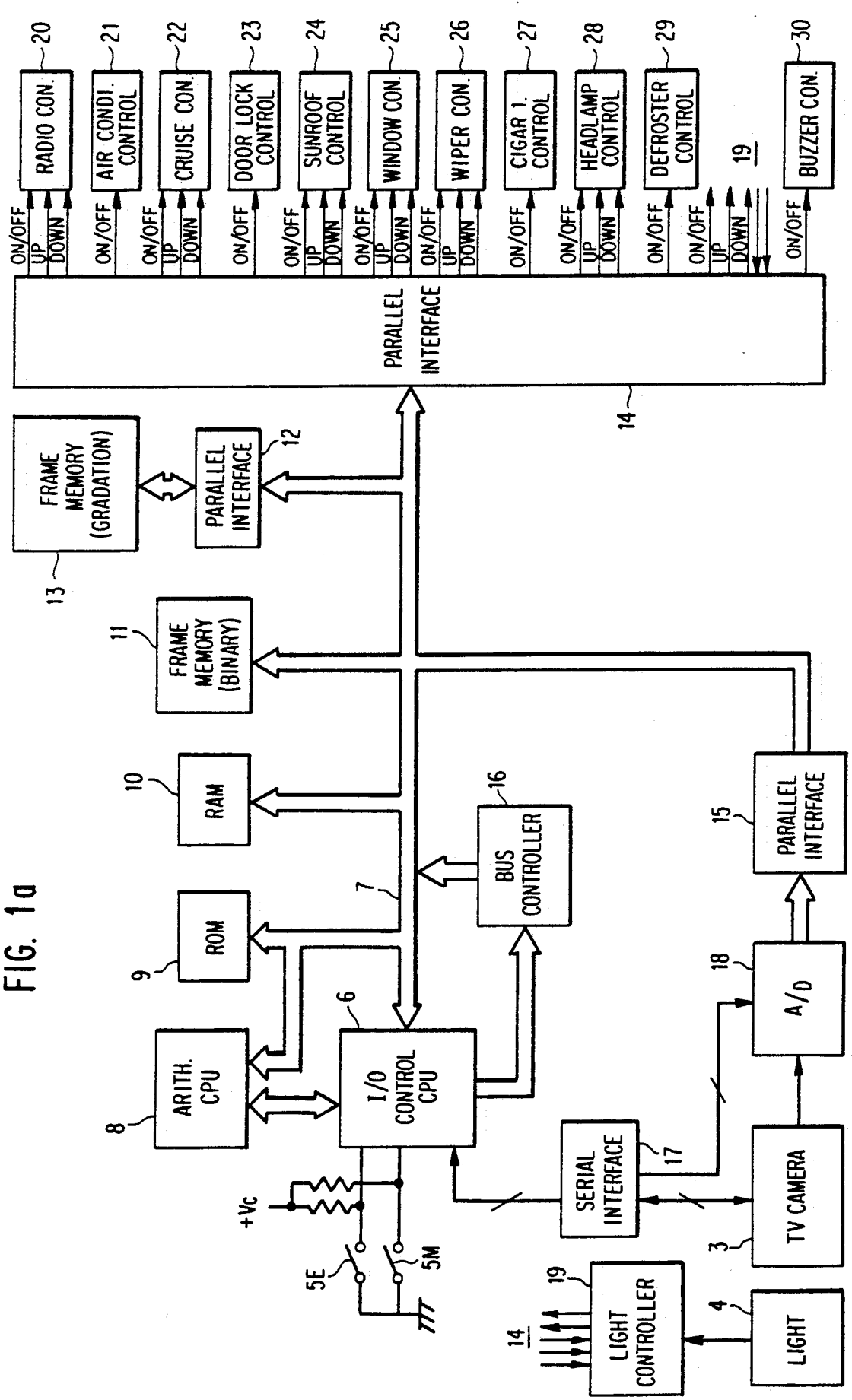

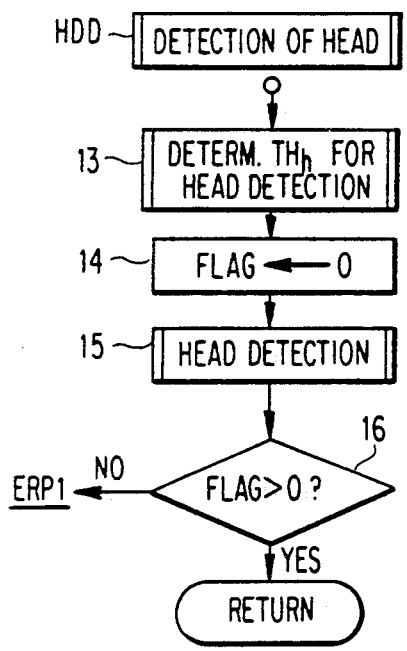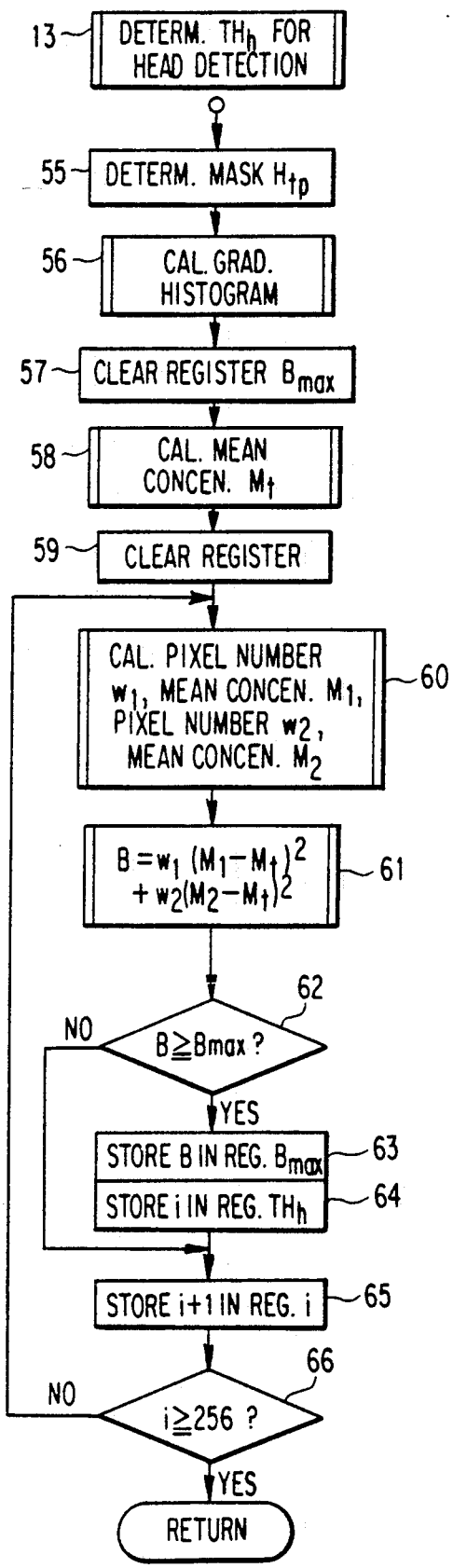

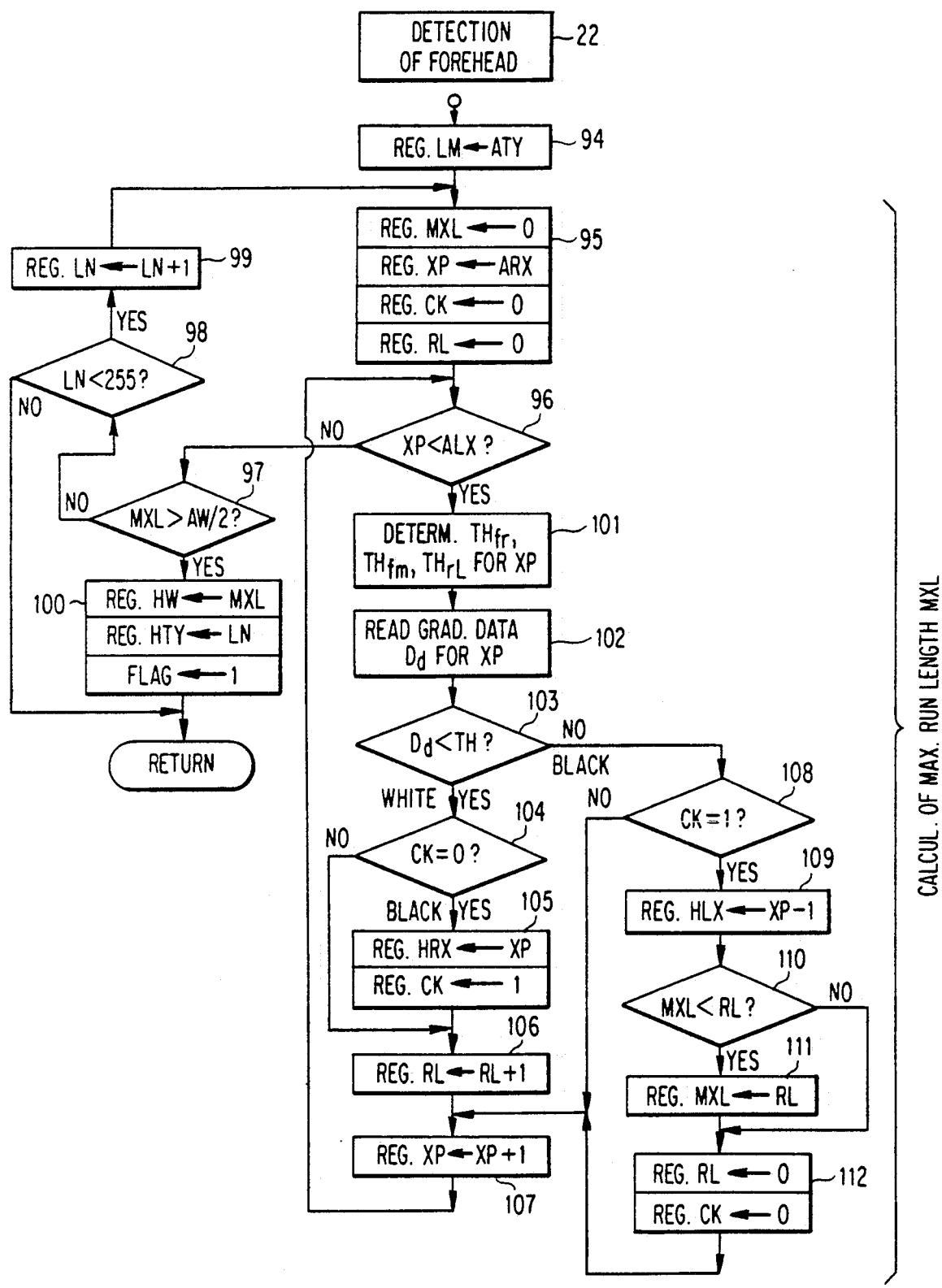

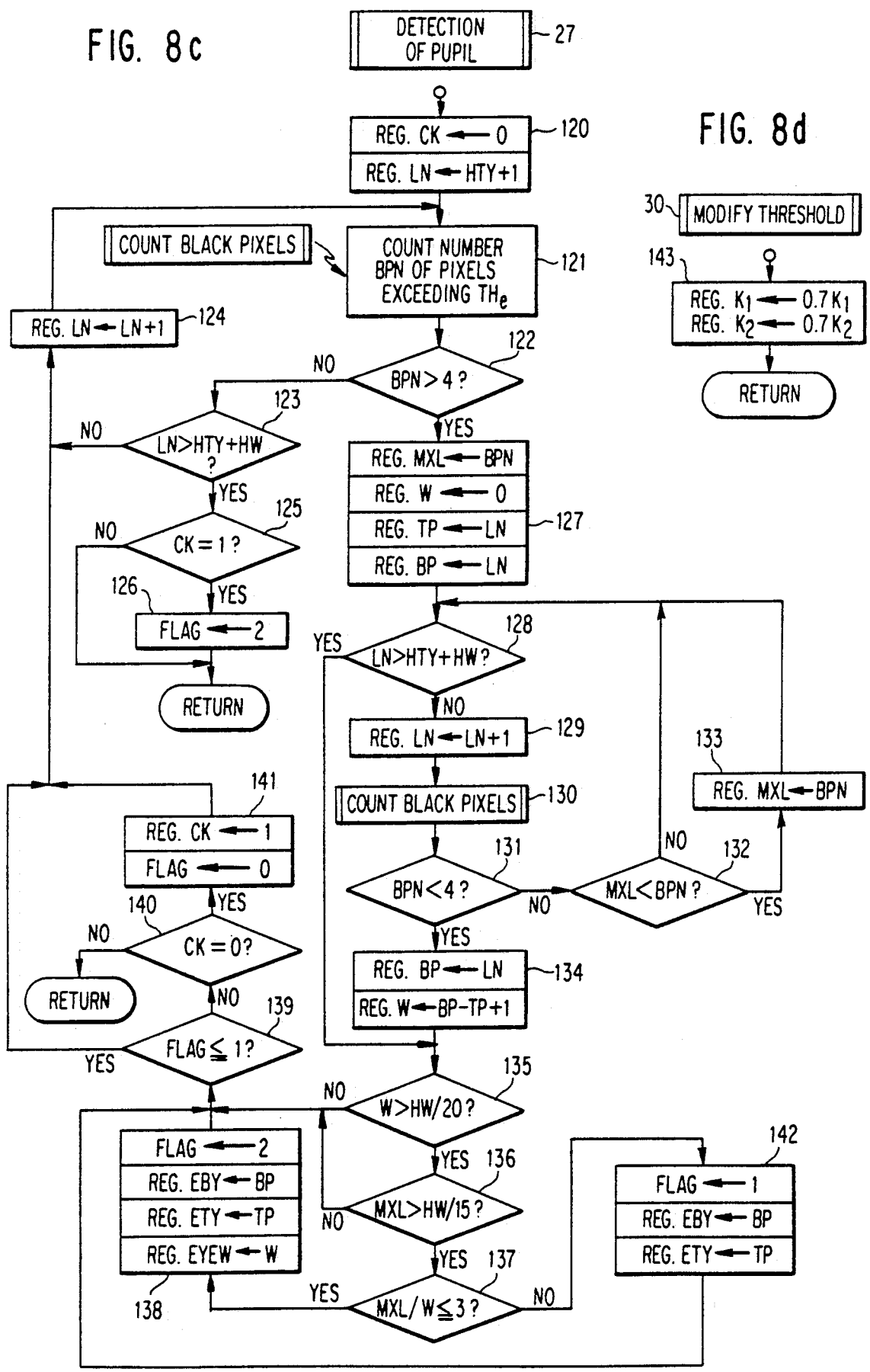

SYSTEM FOR RECOGNIZING IMAGE

FIELD OF THE INVENTION

The present invention relates to a system which detects an image and also the elements of the image and, more particularly, to a system which recognizes an image, such as an object or person to turn on or off desired electrical devices, to increase or decrease the output power of the devices, or to otherwise control the devices by responding to the motion or operation of the image in a noncontact manner, it being noted that the present invention is not limited to these applications.

BACKGROUND OF THE INVENTION

The prior art techniques of this kind are used in automatic doors employing photosensors, footboards, etc., warning devices for informing a person of entry or intrusion, and metal sensors. Any of these devices makes use of a noncontact sensor, such as a photosensor, microswitch, electrostatic field-type proximity switch, or electromagnetic sensor, or a mechanical switch, and detects opening or closure of an electrical contact, making or breaking of an electromagnetic wave path, a change in an electric field, or a change in a magnetic field which is caused when an object or a person makes contact with, approaches, or passes through, the device to turn on or off a desired electrical device, such as a buzzer, meter, automatic door, relay, monitor television, or an electrically controlled machine.

This electrical device cannot be controlled, e.g., turned on and off, unless an object or person is close to the device and makes relatively large movement. Since a change in the state of a minute portion of an object or human body cannot be detected by a sensor, an input device consisting principally of keyswitches has been heretofore most frequently used to energize various electrical devices. As an example, various electrical devices are installed on an automobile, and various keyswitches, volumes, etc. are disposed corresponding to those electrical devices. However, if the driver stretches his or her arm or twists around to operate a switch or volume control, then the driving is endangered. Also, it is easy to meticulously operate a switch or volume control, because the driver cannot keep his or her eyes off the front view for a relatively long time to watch a device. Accordingly, it may be contemplated to install a speech recognition apparatus which recognizes the driver's speech and controls various electrical devices. Unfortunately, a large amount of noise takes place inside the automobile and so the recognition involves noticeable error.

In order to automatically control or energize various electrical devices according to the change in the state of a small portion within a broad region and to permit the driver to control various electrical devices relatively precisely in a noncontact manner without requiring great care or large motion, the present inventor has developed an apparatus that turns on and off devices installed on a vehicle in response to the motion of driver's eyes and mouth, as disclosed in Japanese Patent application No. 272793/1985.

This apparatus makes use of image pattern recognition techniques. In particular, this apparatus uses a camera means for converting an image, or information in the form of light, into an electrical signal and a position-detecting means that detects the position of certain portions of the image. In operation, the apparatus takes a picture of an object or person, such as an automobile driver, and detects the positions of the certain portions of the picture, such as the driver's eyes and mouth.

Since the brightness inside the automobile varies, an illuminating means for illuminating the driver, a brightness-setting means for setting the brightness of the illuminating means, and a brightness control means are provided. The brightness control means detects the brightness on the driver's face and adjusts the setting of the brightness-setting means to change the brightness. Thus, the brightness on the driver's face is maintained constant to prevent the image processing from producing error due to variations in the brightness.

The position of the driver's face may be changed by vibration of the automobile body or may vary because of his or her unintentional minute motion or a change in the posture. Also, the eyes and mouth may be intentionally moved to control electrical devices in a noncontact manner as described later. To precisely extract information about the eyes and mouth from image information in response to the changes in the positions of the face, eyes, and mouth, the apparatus further includes a storage means for storing the detected positions, a window setting means for setting a region narrower than the image produced by the camera means according to the stored positions, a means for setting the region covered by a position-detecting means to the narrower region after a certain period of time elapses since the detected positions are stored in the storage means, and an updating means for updating the positions of the aforementioned certain portions within the narrower region which are stored in the storage means. Once the positions of the certain portions, i.e., the eyes and mouth, are detected, the scan made to detect the eyes and mouth is limited to the narrower region and so they can be detected quickly. Further, the accuracy with which the detection is made is enhanced. Consequently, the apparatus follows the eyes and mouth quickly and precisely.

This apparatus is further equipped with a state change-detecting means for detecting the states of the eyes and mouth at successive instants of time to detect the changes in the states. Also, the apparatus includes an output-setting means which supplies a control signal or electric power to an electrical device according to the changes in the states. Specifically, when the states of the monitored eyes and mouth are found to change in a predetermined manner, i.e, it is ready to activate the electrical device, electric power is supplied to the device according to the change.

The apparatus enables the driver to control the electrical device by moving his or her eyes or mouth while assuming a posture adequate to drive the automobile. Therefore, the electrical device installed on the automobile can be quite easily operated. This contributes to a comfortable and safe drive. As an example, when the driver utters a word to indicate something, the electrical device is controlled according to the shape of the mouth. If the driver utters no word but moves the mouth intentionally as if to utter a word, then the electrical device is controlled according to the shape of the mouth. Since the operation of the device is not affected by utterance, the detection involves no error in spite of noise produced inside the passenger's compartment. Also, if the radio set is played, or if a passenger is speaking loudly, it is unlikely that the electrical device is caused to malfunction.

The concept of the aforementioned apparatus can be similarly applied to the case where a person other than an automobile driver is monitored. For example, a similar apparatus allows a patient with an advanced disease to operate, stop, or control the surrounding medical instruments or assisting instruments with his or her eyes and mouth.

The apparatus can also monitor a machine to detect abnormality and protect the machine. A certain part or portion of the machine is checked for trouble. If this part or portion operates abnormally, the operation of the machine is stopped, or a warning device is operated. In this way, the above described apparatus can be also employed with similar utility to monitor an object other than a person.

Further, the invention can be utilized to monitor a broad region such as a natural sight, especially to monitor animals or vehicles moving in the region. For instance, a gate in a safari park can be opened and closed according to the movement of a vehicle or fierce animals. For a manufacturing plant a belt conveyor line can be monitored to check the parts or products on the conveyor. When they move in a given direction, a safety device is operated, or equipment for the next manufacturing step is run. In this way, the aforementioned apparatus can be used with similar utility in the same manner as the foregoing.

The apparatus described above can detect the driver's head, face, and pupils with high accuracy and yield the foregoing advantages when the monitored object, such as the face of the automobile driver, has a relatively uniform brightness, typically encountered when no car is running in the opposite direction at night and substantially only the interior light illuminates the face, thus permitting the monitoring. However, when the driver's face or head is illuminated with intense light emanating from the headlamps either on a car running in the opposite direction or on a succeeding car even at night, or when the sunlight is intense in the daytime, the external light stronger than the light emitted from the interior light is reflected or intercepted by the driver's face or head. In this situation the brightness on the face frequently becomes nonuniform. That is, intense light is reflected from only a portion of the face; the remaining portion is in shadow and darker. As an example, when the automobile is running in fine weather under the sun located to the right of the automobile, the surroundings of the right eye are very bright, while the surroundings of the left eye are quite dark. In this nonuniform illumination, the accuracy with which the driver's pupils are detected deteriorates, because the apparatus uses only one threshold value in digitizing the whole obtained image. Also, the shape of the driver's mouth is detected with decreased accuracy.

Accordingly, the present inventor has developed an improvement over the aforementioned known apparatus to detect elements, such as the pupils or the mouth or both, of a monitored object, such as the driver's face, with increased accuracy, as disclosed in Japanese Patent application No. 169325/1987. The improved apparatus arithmetically obtains a first gradation histogram for each of small neighboring regions, for example the right half and the left half, within a desired portion such as a human face included in the monitored image. Then, a threshold value for each region is determined, based on the histogram. Information about the gradation of the image is digitized, and a characteristic index (HTY) which indicates the boundary between the hair and the forehead, for example, is determined. This boundary extends through the neighboring regions on the monitored face. Opposite sides of the boundary differ in gray level. A second gradation histogram is created from information about the gradation of an image of a set region $S_d$ based on the determined characteristic index (HTY). The set region $S_d$ contains the eyes. Then, a threshold value ($TH_e$) is determined according to this histogram to digitize the gradation of the image of the region ($S_d$). Thus, the positions of certain small portion or portions, such as pupils, within the region ($S_d$) are detected. The certain small portion can be a mouth instead of pupils.

Determination of a threshold value from a gradation histogram and digitization an analog signal are known in the field of object recognition image processing. These techniques are adequate to separate an object located in front of the background from the background of the image when the concentration of the image varies. Accordingly, this improved apparatus can precisely detect the characteristic index which indicates the upper end of the forehead. This digitization is adequate to detect a characteristic index (HTY) indicating the boundary between the background, or hair, and the main portion, or forehead, in each divided region even if the monitored object is not uniformly illuminated or the brightness of the light source itself varies. Hence, the index (HTY) can be detected with accuracy. The index (HTY) represents a reference position on the detected object, or face.

The region ($S_d$) surrounding the eyes is set according to the characteristic index (HTY). A threshold value is set according to a gradation histogram obtained from this region ($S_d$). Then, an analog signal is transformed into binary codes, using the threshold value. These techniques are adequate to define the given region ($S_d$) containing the certain small regions, or pupils, of the detected object, and to separate the pupils whose gray levels suddenly change in the region ($S_d$), from the background, or the surroundings of the pupils if the object is illuminated asymmetrically or the brightness of the light source itself varies. Consequently, the certain small portions, or the pupils, can be detected accurately. Also, the small portions can be mouth or lips.

In this manner, the improved apparatus is capable of detecting given portions of an object accurately if the object is illuminated asymmetrically or the brightness of the light source itself varies.

If the driver sitting on the driver's seat of an automobile shifts the seat forward or rearward to adjust the posture for driving, the distance between the camera means and the subject, or face, changes. At this time, an automatic focusing device prevents the obtained image from getting blurred. However, the possibility that elements of the image are incorrectly detected, e.g., the nostrils are regarded as the mouth, increases.

SUMMARY OF THE INVENTION

It is an object of the present invention to provide a system capable of detecting elements of an image with increased accuracy.

The above object is achieved in accordance with the invention by a system comprising: a camera which converts optical information obtained from the image into an electrical signal; a position-detecting circuit for detecting three or more elements of the image and their positions according to the electrical signal; a distance detecting circuit for detecting the distances between the detected elements; a normalizing circuit for normalizing data about the detected distances with the distance between given two of the detected elements; a storage circuit which hold reference values previously assigned to the elements of the image; a similarity degree calculating circuit which compares the normalized data about the distances with the reference values and produces data about the degrees of similarity to the elements of a reference image; and a determining circuit which determines whether the image has been successfully detected, from the data about the degrees of similarity of the detected elements.

The position detecting circuit detects the positions of three or more elements, such as the right pupil, the left pupil, the nostrils, and the mouth, of an image such as a human face. The distance-detecting circuit detects the distances between the elements. The distances are normalized with the distance between certain elements. Therefore, the normalized data indicating the distances between the elements are substantially independent of the distance between the camera means and the image. The similarity degree-detecting circuit compares the normalized data with reference values which are stored in the storage circuit and have been previously assigned to the elements of the image to produce data about the degrees of similarity of the detected elements to the elements of the reference image. The degrees of similarity indicate the degrees to which the positions of the elements of the optical image formed by the camera bear resemblance to the positions of the elements of the reference image, or the normalized data about the distances between the elements. As the degrees of similarity of the elements increase, the optical image formed by the camera means approaches the reference image. The determining circuit determines whether the elements have been detected successfully, based on the data about the degrees of similarity. That is, if a high degree of similarity is obtained, then it is found that the image formed by the camera approximates the reference image. Conversely, if a low degree of similarity is obtained, then the image formed by the camera is judged to be different from the reference image.

Accordingly, where the elements such as the pupils and the mouth of an automobile driver's face, for example, are detected to turn on and off or otherwise control electrical devices installed on an automobile according to the shapes of the elements and the pattern of change in the shapes, the decision to determine whether the image formed by the camera is the face or not can be made precisely. Therefore, the electrical devices can be controlled with reduced error. Especially, where the distance between the camera and the driver's face change as encountered when the driver moves the seat forward or rearward, the pupils and the mouth can be detected correctly. The electrical devices can be controlled precisely according to the positions of the elements and the changes in the shapes.

Other objects and features of the invention will appear in the course of description thereof which follows.

BRIEF DESCRIPTION OF THE DRAWINGS

FIG. 1a is a block diagram of a system according to the invention;

FIG. 1b is a perspective view of the dashboard of an automobile, for showing the arrangement of the camera 3 and the light 4 shown in FIG. 1a;

FIG. 2 is a flowchart schematically illustrating a sequence of operations performed by the microprocessor 6 shown in FIG. 1a;

FIGS. 3, 4, 5a, 5b, 5c, 6, 7a, 7b, 7c, 8a, 8b, 8c, 8d, 9a, 9b, 9c, 9d, 10a, 10b, 11a, 11b, 12a, 12b, and 12c are flowcharts particularly illustrating operations performed by the microprocessors 6 and 8 shown in FIG. 1a;

DETAILED DESCRIPTION OF THE INVENTION

Referring to FIG. 1a, there is shown a system embodying the concept of the present invention. This system is installed on an automobile and acts to turn on or off, increase or decrease the power, or otherwise control electrical devices installed on the automobile, according to intentional movement of the pupils and the mouth of the driver's face.

Figure 1B:
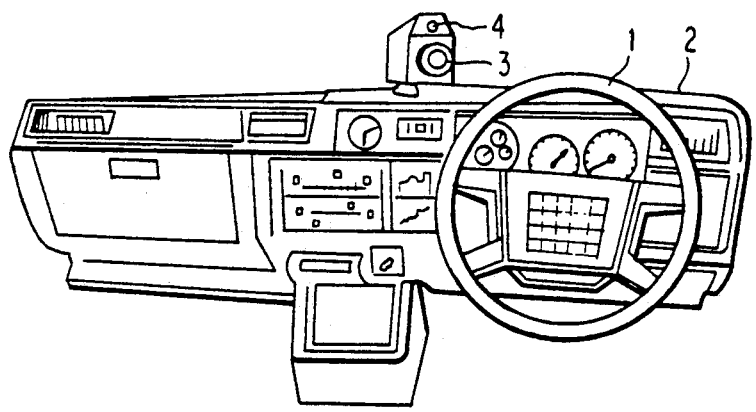
Figure 3:
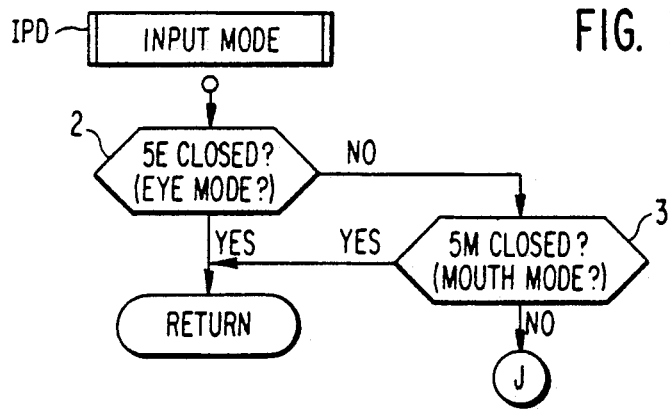
Figure 4:
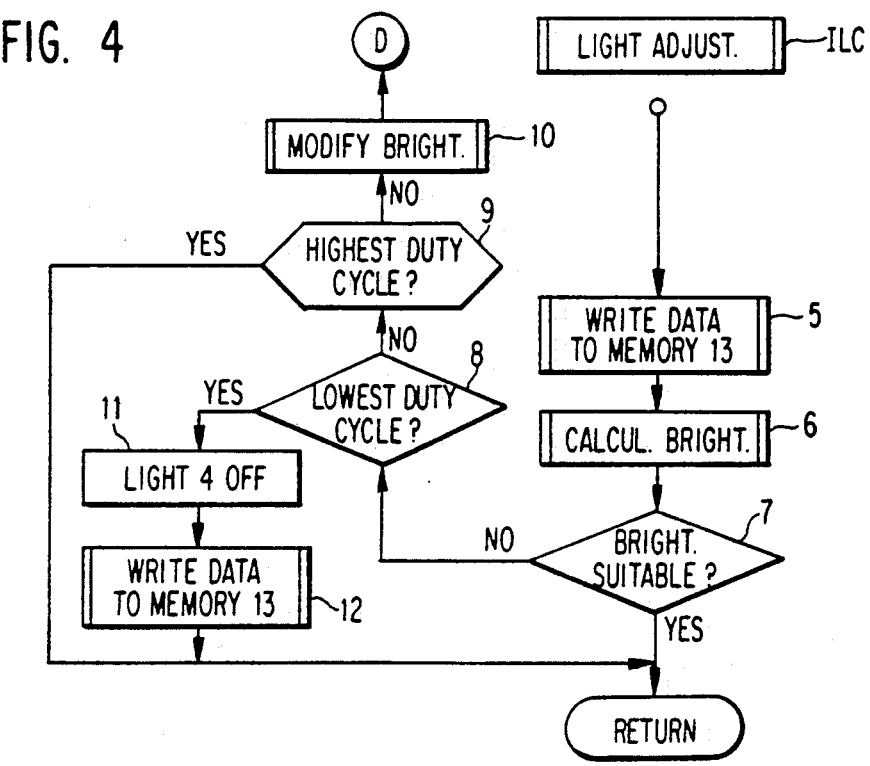

The system includes a TV camera 3 and a light 4 that illuminates at least the driver's face. The camera 3 and the light 4 are combined into a unit and mounted on the instrumental panel 2 so as to be movable vertically and horizontally, as shown in FIG. 1b. Indicated by numeral 1 in FIG. 1b is the steering wheel turned by the driver to steer the vehicle.

Referring again to FIG. 1a, the light 4 is turned on and powered by a light controller 19, which also controls the brightness of the light. The light 4 consists of an incandescent lamp using a filament as a light source. The controller 19 rapidly switches on and off a direct voltage, using a thyristor chopper and applies it to the light 4. When an OFF signal is applied to the controller 19 to turn off the light, the controller turns off the thyristor chopper. When an ON signal is applied to the controller 19, it switches on and off the chopper at a normal duty cycle. When a signal indicating an increase in the brightness arrives at the controller, it increases the duty cycle by one step. When a signal indicating a decrease in the brightness is fed to the controller, it reduces the duty cycle by one step. If the brightness is increased to its maximum level or reduced to its minimum level, the brightness is no longer changed. A microprocessor 6 supplies the aforementioned signals to the light controller 19 via an interface 14 to turn on or off the light or to increase or decrease the brightness.

The TV camera 3 uses a two dimensional CCD array constituting 256 by 256 picture elements per frame. The camera 3 produces an analog video signal. The microprocessor 6 supplies a signal via an interface 17 to the camera 3 to turn on or off the camera. This camera 3 delivers successive video signals indicating 256×256 picture elements per frame to an A/D converter 18, and applies pixel sync pulses to the converter 18 for synchronization with A/D conversion. Further, the camera 3 furnishes frame sync pulses, line sync pulses, and pixel sync pulses to the microprocessor 6 via the interface 17.

The microprocessor 6 writes data about one frame of an image to a frame memory 13 in synchronism with the frame sync pulses. The memory 13 consists of a RAM. The address at which data is written to the memory 13 is advanced in synchronism with the line sync pulses and the pixel sync pulses.

In this example, the A/D converter 18 converts its input signal to 8-bit, digital data indicating 256 different gray levels. That is, 8 bits of image data are written to the frame memory 13 per pixel.

Mode switches 5E and 5M are connected to the microprocessor 6. The switch 5E is used to designate a mode in which the system responds to the pupils. When the switch 5E is closed to establish this mode, the microprocessor 6 controls the operation of electrical devices 20, 21, 29, 30 (described later) according to the positions of the pupils and the pattern of a blink.

The switch 5M is used to specify a mode in which the system responds to the mouth. When this switch 5M is closed to establish this mode, the microprocessor 6 controls the operation of electrical devices 20-30 (described later) according to the pattern of change in the shape of the mouth.

Another microprocessor 8 which performs arithmetic operations for making various decisions is connected with the microprocessor 6. A frame memory 11, a ROM 9 for normal computer system control, a RAM 10, a bus controller 16, and the aforementioned frame memory 13 are connected to the microprocessor 6. The frame memory 11 consists of a RAM and temporarily stores binary-coded data about one frame of image. Every bit of the data indicates the presence or absence of a black spot on a pixel. Also, the electrical devices 20-30 and the light controller 19 which are controlled by this microprocessor 6 are connected to the microprocessor 6.

The electrical device 20 is a radio controller that electrically turns on or off the power of a radio set and electrically controls the volume. When an ON signal is applied to the controller 20, it turns on the power of the radio set. When an OFF signal is applied to the controller 20, it turns off the power. When a signal indicating an increase in the volume is fed to the controller 20, it steps up the volume by one step. When a signal indicating a decrease in the volume is applied to the controller 20, it decreases the volume by one step. When the volume reaches its maximum or minimum level, the volume is no longer varied.

The electrical device 21 is an air conditioner controller which simply turns on or off an air conditioner. A controller incorporated in the body (not shown) of the air conditioner makes a switch between cooling and warning, increases or decreases the power, and turns on or off a cleaner according to the room temperature and contamination of the air.

The electrical device 22 is a cruise controller which acts only to operate or stop the cruise control system. As is known in the art, when cruise control is selected, one type of cruise control unit stores the present road speed. Then, the throttle opening is controlled to maintain the actual speed of the automobile at the speed stored in a memory. When the cruise control is ended, the throttle opening is no longer controlled. In another type of cruise control system, when cruise control is selected, the throttle opening is controlled until the actual speed of the vehicle reaches the preset or stored speed which may or may not be altered, taking the present speed into account When the cruise control is stopped, the control over the throttle opening is stopped. In either type, when it is instructed to increase the speed, it increases the set speed by one step. When it is instructed to decrease the speed, it decreases the set speed by one step. These operations are performed under the control of the cruise controller 22. When an ON signal is applied to the controller, it initiates cruise control. When an OFF signal is applied to the controller, it stops cruise control. When a signal indicating an increase in the speed, it increases the set speed by one step. When a signal indicating a decrease in the speed is fed to it, it decreases the set speed by one step.

The electrical device 23 is a door lock controller 23 which locks or unlocks the doors according to the conditions of a driver's seat door lock/unlock switch mounted in the driver's seat door, an all door lock/unlock switch, and lock/unlock switch mounted in the other doors, and also according to the vehicle speed and other conditions of the vehicle. When an ON signal is applied to the controller 23, it causes the doors to be locked unless there is any precluding condition. When an OFF signal is applied to the controller 23, it causes the doors to be unlocked unless there is any precluding condition.

The electrical device 24 is a sunroof controller which, in this example, drives a sliding sunroof. When a normally installed switch is operated, the controller opens or closes the sunroof. When an OFF signal is applied to the controller, it opens the sunroof fully. When an OFF signal is applied to the controller, it closes the sunroof fully. When an UP signal is applied to it, it opens the sunroof by one step. When a DOWN signal is applied to it, it closes the sunroof by one step.

The electrical device 25 is a window controller which vertically moves the sliding windowpanes at the doors to open or close them. When a normally installed switch is operated, the controller 25 opens or closes the sliding windowpanes. When an ON signal is applied to the controller 25, it fully closes the sliding windowpane at the driver's seat door. When an OFF signal is applied to the controller 25, it fully opens the windowpane. When an UP signal is fed to the controller 25, it closes the windowpane by one step. When a DOWN signal is supplied to the controller 25, it opens the windowpane by one step.

The electrical device 26 is a wiper controller that drives the wipers when a normally installed switch is operated. When an ON signal is applied to the controller 26, it drives the wipers at a standard speed. When an OFF signal is applied to the controller 26, it stops the wipers and places them in their standby positions. When an UP signal is applied to the controller 26, it increases the speed of the wipers by one step. When a DOWN signal is applied to the controller 26, it decreases the speed by one step.

The electrical device 27 is a cigar lighter controller. When an ON signal is applied to the controller 27, it recesses a cigar lighter mechanism. When an OFF signal is applied to the controller 27, it extrudes the lighter mechanism even if a predetermined temperature is not reached. The controller operates in a conventional manner in other respects. When the mechanism is recessed, it makes a mechanical contact with the electric circuit, so that the cigar lighter is energized. When the predetermined temperature is reached, the lighter is automatically extruded and gets deenergized.

The electrical device 28 is a headlamp controller which responds to a headlamp switch having three positions—OFF, PARK, and HEADLAMP. In the HEADLAMP position, the controller 28 lights the parking lamps, raises the headlamps from their recessed positions, lights them, selects a low-beam position or a high-beam position according to the setting of a dimmer switch. In the PARK position, the controller 28 puts out the headlamps and lights only the parking lamps. In the OFF position, the controller puts out the parking lamps and recesses the headlamps. When an ON signal is applied to the controller, it lights the parking lamps, raises the headlamps, and lights them. When an UP signal is applied to the controller, it sets the headlamps in the next higher position. When a DOWN signal is supplied to the controller, it sets the headlamps in the next lower position. When an OFF signal is applied to the controller, it puts out the headlamps and lights only the parking lamps.

The electrical device 29 is a defroster controller which energizes or deenergizes the heater embedded in the rear window when a normally installed switch is closed or opened. When an OFF signal is applied to the controller 29, it energizes the embedded heater. When an OFF signal is applied to the controller, it deenergizes the heater.

The electrical device 30 is a buzzer controller. When an ON signal is applied to the controller 30, it operates a buzzer (not shown). When an OFF signal is applied to the controller 30, it ceases to operate the buzzer. As described later, when the driver keeps closing his or her eyes for a given period of time, the controller regards the driver as taking a nap and activates the buzzer. When the mode switch 5E or 5M is closed to carry out the routine responding to pupils or mouth, if the image pattern processing is disabled, then the controller 30 activates the buzzer.

Figure 2:
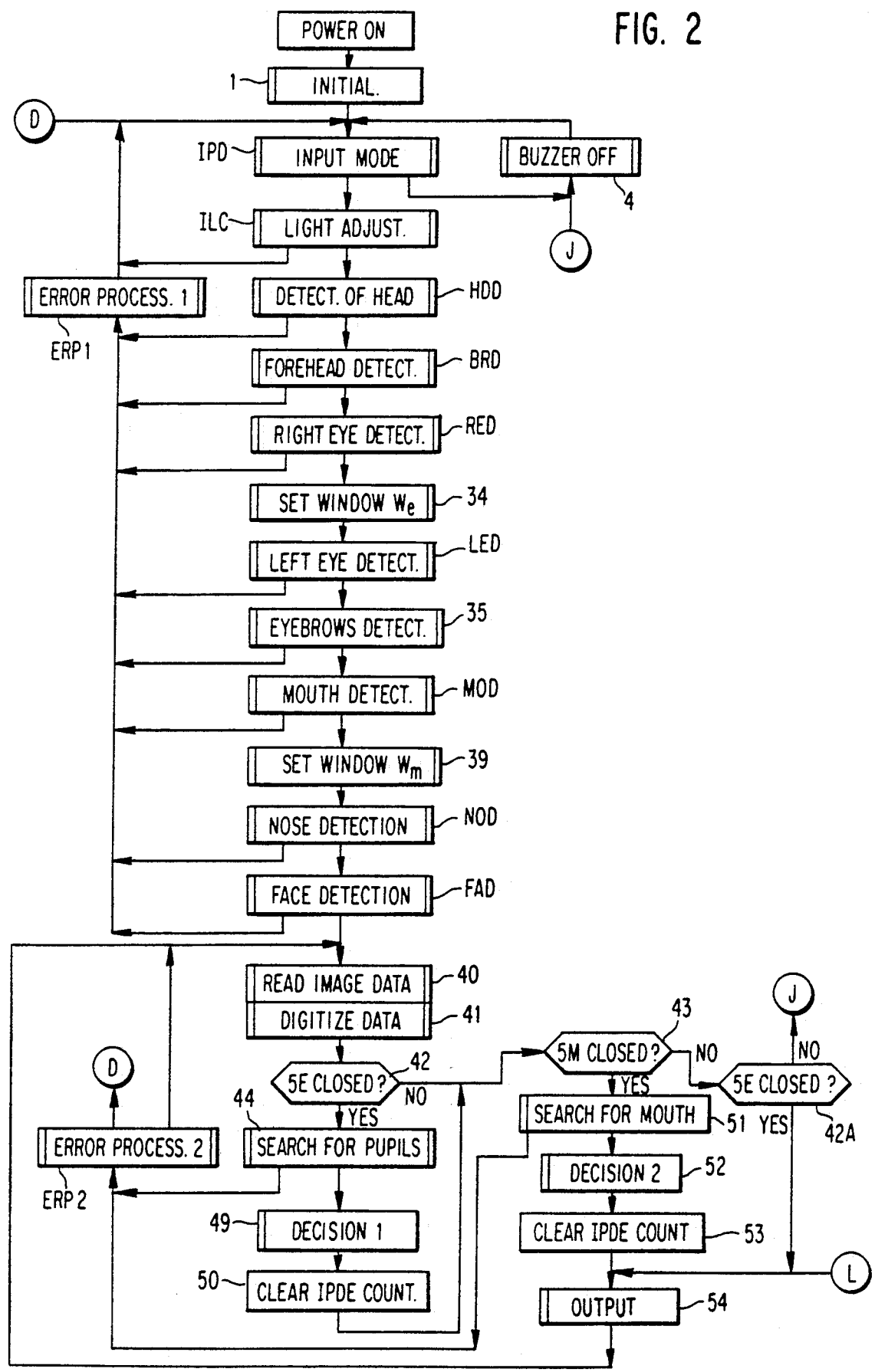

FIG. 2 illustrates the main routines performed by the microprocessors 6 and 8. Particulars, or subroutines, of the main routines are illustrated in FIGS. 3-9d. The manner in which the microprocessors 6 and 8 control the electrical devices in accordance with a set program is described next by referring to these figures.

Referring to FIG. 2, when the electric power is turned on, the microprocessor 6 initializes the input-/output ports to turn off the electrical devices 19-30 and the TV camera 3 and to clear or reset internal registers, counters, flags, and the RAMs 10, 11, 13 (step 1).

Then, control proceeds to a subroutine for judging the input mode (IPD), where a decision is made to see whether the switches 5E and 5M are open or closed. This subroutine is particularly illustrated in FIG. 3, where if either the switch 5E or 5M is closed, then control goes to a subroutine for adjusting light (ILC), in which the light controller 19 and the TV camera 3 are turned on. When at least one of the switches 5E and 5M is closed, if both switches are opened, then the light controller 19 and the TV camera 3 are turned off. Also, the buzzer controller 30 is not operated (step 4). If both switches 5E and 5M are open, the microprocessor waits until at least one of them is closed, and the image pattern processing is not carried out.

When at least one of the mode-indicating switches 5E and 5M is closed, control goes to the subroutine for adjusting light (ILC). This subroutine is particularly illustrated in FIG. 4, where the microprocessor 6 supplies ON signals to the light controller 19 and to the TV camera 3. Then, the microprocessor waits until the brightness of the light stabilizes and the driver's face becomes motionless at the driving position. Thereafter, the microprocessor starts to write data about one frame of image to the frame memory 13 in synchronism with the frame sync pulses delivered from the TV camera 3. The data representing gray levels comprises 8 bits per pixel. Thus, the data derived from one frame, or 256 by 256 pixels, is written to the memory 13 (step 5).

The microprocessor 8 then totals the number of pixels belonging to each of discrete gray levels of the image data stored in the memory 13. The lowest gray level, or level 0, indicates the maximum brightness. The highest level, or level 255, represents the darkest condition. In this way, a histogram showing the brightness distribution is created. In this histogram, the gray levels i (i=-0-255) are plotted on the horizontal axis and the number of pixels belonging to each level is plotted on the vertical axis. The histogram is stored in the ROM 10. Then, the microprocessor 8 calculates the deviation of the histogram from a reference histogram stored in the ROM 9 for each gray level. The microprocessor 8 totals the squares of every deviation (step 6), and compares the calculated sum with a reference value (step 7). If the sum lies outside a given range, then the microprocessor supplies an UP or DOWN signal to the light controller 19 according to the sum of all the deviations (step 10). Then, after the brightness of the light 4 is regulated at a modified brightness, the microprocessor writes data about another frame of image to the memory 13 (step 5). In this manner, the various arithmetic operations are carried out by the microprocessor 8. Thus, the brightness of the light 4 is controlled in such a way that the histogram originating from the image data lies within a certain range (steps 5, 6, 7, 10).

During the execution of the subroutine for adjusting the light (ILC), when the brightness is set to its highest or lowest level, the light controller 19 informs the microprocessor 6 of this fact. If the microprocessor 6 is informed that the brightness is set to its lowest level (step 8), then it turns off the light controller 19 (step 11), thus ending the adjustment of the brightness. After the light 4 goes out, the microprocessor reads data about one frame of image and writes it to the memory 13 (step 12). If the microprocessor 6 is informed that the brightness is set to its highest level, then it ends the adjustment of the brightness (step 9).

Figure 13A:
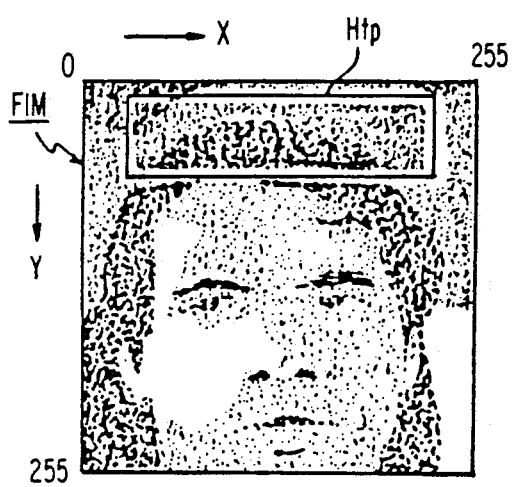
FIGS. 13a, 13b, 13c, 13d, 13e, 13f, 13g, and 13h, 13i, 13j are plan views of all or some of images taken by the camera 3 shown in FIGS. 1a and 1b.

After the execution of the subroutine for adjusting light (ILC) is complete, control proceeds to a head detection subroutine (HDD). This subroutine is particularly illustrated in FIG. 5a. A subroutine 13 for determining a threshold value $TH_h$ used for detection of the head is effected to determine the threshold value. Then, a flag register which acts to store data indicating whether the head is successfully detected or not is first cleared (step 14). Then, a subroutine 15 for detecting the head is carried out, using the threshold value $TH_h$ to detect the position ATY of the front end of the head (FIG. 13c). The detection might end in failure. When it is successfully detected, 1 is written to the flag register in the subroutine 15. In case of failure the contents of the register remain zero.

Upon completion of the execution of the subroutine 15, the contents of the flag register are checked (step 16). If the value held in the register is 0, control goes to a subroutine for error processing 1 (ERP1). This subroutine is particularly illustrated in FIG. 6. A register IPDF which counts the number of errors or unsuccessful detections is incremented (step 17). A decision is made to ascertain whether the number is equal to or in excess of 16 (step 18). If so, the buzzer controller 30 is instructed to operate the buzzer (step 19). Subsequently, control returns to step 5, where an image is read. If the number is less than 16, control goes back to step 5 without operating the buzzer.

If the result of the check made at step 16 (FIG. 5a) is that the value held in the flag register is larger than 16, then control goes to a subroutine for detecting the forehead (BRD). This subroutine is particularly illustrated in FIG. 7a, where a subroutine 20 is first carried out to set the threshold value $TH_f$ used for detection of the forehead. Then, the flag register is cleared (step 21), followed by execution of a subroutine 22 for detecting the forehead. If the forehead is successfully detected in this subroutine 22, 1 is written to the flag register. In case of failure, the contents of the register remain zero.

After completing the subroutine 22 for detecting the forehead, the contents of the register are checked (step 23). If the value held in it is zero, control proceeds to the subroutine for error processing 1 (ERP1) (FIG. 6), where the register IPDF which counts errors is incremented (step 17). A check is made to see whether the total count is equal to or larger than 16 (step 18). If so, the microprocessor instructs the buzzer controller 30 to operate the buzzer (step 19), after which control returns to the subroutine 5 for reading an image. If the total count is less than 16, control goes back to the subroutine 5 without operating the buzzer.

If the check made at step 23 (FIG. 7a) reveals that the value held in the flag register exceeds 0, then control proceeds to a subroutine for detecting the right eye (RED). This subroutine is particularly illustrated in FIG. 8a, where 0.05 and 0.4 are held in registers $K_1$ and $K_2$, respectively, which store constants used for detection of pupils (step 24). Then, a subroutine 25 for determining the threshold value $TH_e$ used for detection of pupils is effected.

After completion of the execution of the subroutine 25, the flag register is cleared (step 26). Then, a subroutine 27 for detecting pupils is carried out. In this subroutine 27, if pupils are detected while satisfying a second, stricter condition, then 2 is held in the flag register. If pupils are detected in such a way that the second condition is not met but that a first, milder condition is fulfilled, then 1 is held in the flag register. If pupils are detected in such a manner that neither the first condition nor the second condition is satisfied, then the contents of the flag register are retained at zero.

After the end of the execution of the subroutine 27, the contents of the flag register are checked (steps 28, 29). If the contents are 2, step 31 and the following steps are carried out to calculate the central positions of the pupils. If the contents of the register are 1, a subroutine 30 for modifying the threshold value is executed. Also, the subroutine 25 for determining the threshold value $TH_e$ used for detection of pupils is carried out. If the number held in the flag register is 0, then control goes to step 17.

If the number held in the flag register is 2, the buzzer controller 19 is instructed not to operate the buzzer (step 31). Subsequently, the error count register IPDF is cleared (step 32). A subroutine 33 is then carried out to calculate the central positions of the eyes. Next, a subroutine 33A is executed to calculate a feature. In particular, the number of successive black pixels on the right pupil is counted. Also, the length of the boundary is measured. The obtained values are held in a given register. Then, control proceeds to step 34 (FIG. 2) for executing a subroutine for setting a window $W_e$. In this subroutine 34, a small region of a given area is defined around the center of the pupil.

Then, a subroutine (LED) for detecting the left eye is carried out in the same manner as the subroutine (RED) for detecting the right eye. That is, the central position of the left pupil, the number of successive black pixels, and the length of the boundary are calculated. The resulting data is held in given registers.

Subsequently, a subroutine 35 is executed to detect opposite ends BRX and BLX (FIG. 13i) of the eyebrows. Control then goes to a subroutine 36, where the mouth is arithmetically found. Control proceeds to a subroutine (MOD) for detecting the mouth. In this subroutine, the central position (MCX, MCY) (FIG. 13j) of the mouth is detected. Then, a window $W_m$ is set (step 39) to define the small region $W_m$ of a given area around the central position of the mouth.

After setting the windows $W_e$ and $W_m$ in this way, a subroutine (NOD) for detecting nose is carried out to detect the center of a group of black pixels in the nose, including the two nostrils. Then, a subroutine (FAD) for checking detection of face is executed to determine whether the image including the detected elements, i.e., both pupils, the mouth, and the nostrils, is a face.

If the result of the decision is that the image is a human face, then control proceeds to step 40 and the subsequent steps for automatic detection and control. Specifically, data about a new image is accepted (step 40). The analog data is digitized (step 41). The image is searched for the pupils (step 44). The image is searched for the mouth (step 51). Decision 1 is made to detect the opening and closing pattern of the eyes and to detect the positions of the pupils (step 49). Decision 2 is made to detect the shape of the mouth and to detect the pattern of change in the shape of the mouth (step 52). An output signal is produced (step 54). If the result of the decision is that the image is a human face, then control goes to the subroutine for error processing 1, whence control returns to the subroutine (IPD) for judging input mode. Then, the aforementioned series of subroutines beginning with the adjustment of light (LCL) and ending with check on detection of face (FAD) is repeated.

The automatic detection and control beginning with the subroutine 40 are carried out in the manner described below. First, data about another frame of the image is written to the memory 13 (step 40). Then, a subroutine 41 is effected to digitize the analog data within the window region $W_e$, using the threshold value $TH_e$ determined in the subroutine 25. Inside the window region $W_m$, the analog data is digitized, using a threshold value $TH_m$ determined in the subroutine MOD6 for detection of the mouth. In the other regions, the analog data is digitized, using threshold values $TH_{fr}$, $TH_{fm}$, and $TH_{fL}$ determined in the subroutine 20 for detection of the forehead. The resulting digital data is written to the memory 11. Subsequently, the condition of the mode switch 5E is examined (step 42). If it is closed, the subroutine 44 for searching for the pupils is carried out. If the search results in failure, a subroutine (ERP2) for error processing 2 is executed. This error processing 2 is similar to the error processing 1 illustrated in FIG. 6 except that step 18 is replaced by "IPDF≧8?". Again, image data is accepted (step 40). The data is digitized (step 41). The image is searched for the pupils (step 44). If the pupils cannot yet be detected after this series of operations is repeated eight times, the present position of the face is regarded as inappropriate or the detection of the pupils made in the subroutine 27 is regarded as inappropriate. In this case, control returns to step 2. If the search for the pupils is successfully made, then decision 1 is made (step 49) to detect the pattern of opening and closing of the eyes and to detect the movement of the positions of the pupils. Data corresponding to the result of the decision is stored in the output register. The IPDF counter which counts the number of unsuccessful detections is cleared (step 50).

Then, a check is performed to ascertain whether the mode-specifying switch 5M is closed (step 43). If it is closed, the image is searched for the mouth (step 51). If the mouth is not yet detected after this series of operations is repeated eight times, then either the present position of the face or the detection of the mouth position made at steps 35–39 is regarded as inappropriate. Control then returns to step 2. If the search for the mouth is successfully made, decision 2 is made (step 52) to detect the shape of the mouth and the pattern of change in the shape. Data corresponding to the result of the decision is held in the output register. The IPDF counter that counts the number of errors is cleared (step 53). In an output subroutine 54, the contents of the output register are transferred to the interface 14.

While the search for the pupils and the search for the mouth are successful, the series of operations including the reading of image (step 40), digitization (step 41), the search for the pupils and the mouth (steps 44, 51), the decisions 1, 2 (steps 49, 52), and the output subroutine (step 54) are repeated. During this process, the aforementioned various threshold values are not modified to detect the pupils and the mouth at a high speed. If the search eventuates in failure, the series of operations beginning with the "decision on input mode (IPD)" and ending with the "check on detection of face (FAD)" is now carried out to update the various threshold values.

In this example, in order to precisely detect various portions of the face even if the face is not illuminated uniformly, the following subroutines, steps, and means are taken into account: subroutine 13 for determining threshold value $TH_h$ used for detection of head; subroutine 15 for detection of head; subroutine 20 for determining threshold value $TH_f$ for detection of forehead; subroutine 22 for detection of forehead; subroutine 24 for determining threshold value $TH_e$ for detection of pupils; subroutine 27 for detection of pupils; the addition and the contents of subroutine 30 for modifying the threshold values; subroutine 24 and step 25 in subroutine 36 for arithmetically finding the mouth region; that the threshold value $TH_m$ used for detection of mouth is determined in the same manner as in subroutine 27 and 30 for detection of the pupils and for modifying the threshold values; that analog image data is digitized, using the threshold value $TH_e$ determined in subroutine 24 for determining threshold value $TH_e$ used for detection of pupils and the threshold value $TH_m$ determined in subroutine 36 for arithmetically finding the mouth region within the set windows $W_e$ and $W_m$ in digitization subroutine 41; calculating the threshold value used for detection of nose (NOD) in the same way as the detection of right eye (RED), digitizing the image information derived from the nose region, using the threshold value to detect the nostrils; and digitizing the image information about the other portions, using the threshold values $TH_{fr}$ (region 1), $TH_{fm}$ (region 2), and $TH_{fL}$ (region 3) (FIG. 4c) determined in subroutine 20 for determining the threshold value $TH_f$ used for detection of forehead. The pupils, the mouth, the nose, etc. are detected with accuracy if the brightness of the illuminating light changes or if the face is not uniformly illuminated, owing to the above-described processings. Therefore, during the execution of the light adjustment subroutine (LCL), if the brightness of the light 4 is required to be adjusted outside the intended range of brightness, the microprocessor does not produce an error signal, but rather detection and control operations subsequent to the head detection subroutine (BRD) are performed. This is one feature of the invention.

Because of these features, the pupils, the mouth, and the nose are detected accurately if the brightness of the light varies or if the face is not illuminated uniformly. Hence, the adjustment of the brightness can be omitted. Also, a very simple adjustment of the brightness can be made. As an example, data about the gray levels within one frame is digitized, i.e., classified into white pixels and black pixels, using a fixed threshold value. Then, the number of the white pixels is counted. The brightness is so adjusted that the total count lies within a given range.

Referring to FIG. 5b, the subroutine 13 for determining the threshold value $TH_h$ used for detection of head is now described. This subroutine 13 is carried out by the microprocessor 8 under the control of the microprocessor 6. The magnification and the focus of the camera 3 are so set that substantially the whole driver's face is contained within the frame of image $F_{im}$ formed by the camera as shown in FIG. 13a and that the front end of the head and the background, or the inner surface of the vehicle roof, coexist. A small region $H_{tp}$ is formed in such a way that the possibility that the front end of the head and the background coexist in the region $H_{tp}$ is highest. The microprocessor 8 stores data on the small region $H_{tp}$ in an image data processing region inside the memory 13 (step 55). Then, it creates a simple gradation histogram from the image data obtained from the region $H_{tp}$ (step 56). As already described, each byte of the data comprises eight bits. The gradation comprises 256 different gray levels, from level 0 to level 255. To create the histogram, the microprocessor 8 read all the image data originating from the region $H_{tp}$ in a given sequence, and totals the number of pixels having the same gray level for each gray level.

Then, the microprocessor 8 clears a register $B_{max}$ (step 57), and calculates the average concentration $M_t$ of the gradation histogram (step 58). Subsequently, it computes the number of pixels $w_1$ having gray levels lower than gray level i and the average concentration $M_1$ of these pixels. The gray level i is held in a register i. Also, it calculates the number of pixels $w_2$ having gray levels equal to or larger than the gray level i and the average concentration $M_2$ of these pixels (step 60). That is, the histogram is divided into a first group of gray levels lower than the gray level i and a second group of gray levels equal to or larger than the gray level i. The number of pixels $w_1$ included in the first group and the average concentration $M_1$ of this group are calculated. Similarly, the number of pixels $w_2$ included in the second group and the average concentration $M_2$ of this group are computed. Then, the formula $$B = w_1 (M_1 - M_t)^2 + w_2 (M_2 - M_t)^2$$

is calculated (step 61). That is, the square of the deviation of the average concentration of the first group from the average concentration $M_t$ of all the pixels is added to the square of the deviation of the average concentration of the second group from the average concentration $M_t$ of all the pixels to calculate the degree of discrimination B between the first and second groups. As the gray level i divides the region $H_{tp}$ into the two groups having different average concentrations more clearly, the value of B increases. In other words, the gray level i which gives rise to a large value of B is the threshold value separating the black hair of the head from the background in the region $H_{tp}$. The microprocessor 8 then performs a check to see whether the calculated value of B is equal to or larger than the value held in the register $B_{max}$ (step 62). If so, this value of B is stored in the register B (step 63). The gray level i is stored in a threshold value register $TH_i$. The register i is incremented (step 65). If the value of B is less than the value held in the register $B_{max}$ (step 62), then control directly proceeds to step 65.

Thereafter, the microprocessor 8 does a check to determine whether the level i held in the register i is equal to or in excess of level 256, for ascertaining that the calculation of B is completed for all the gray levels (step 66). If not so, the calculations at the steps 60 and 61 are repeated. When the level i held in the register i reaches level 256, the microprocessor 8 informs the microprocessor 6 that the processing is complete. The microprocessor 6 then reinitiates the execution of the subroutine (FIG. 5a) so that control may go toward step 14.

Under this condition, the calculation of B (steps 60, 61) is complete for each of the gray levels 0–255. The maximum value of the calculated values of B is held in the register $B_{max}$. The gray level i, or the threshold value $TH_h$, at which the maximum value is obtained is held in the threshold value register $TH_h$.

Figure 13B:
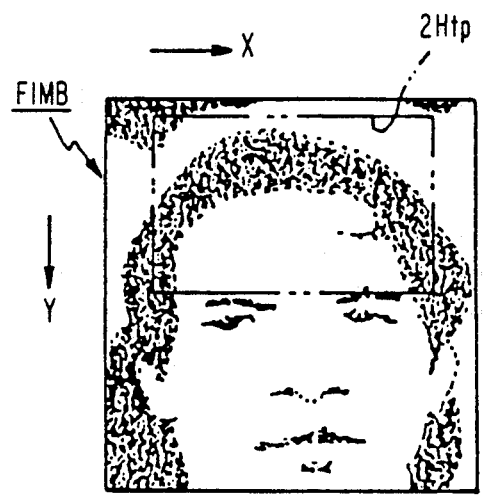
Figure 13C:
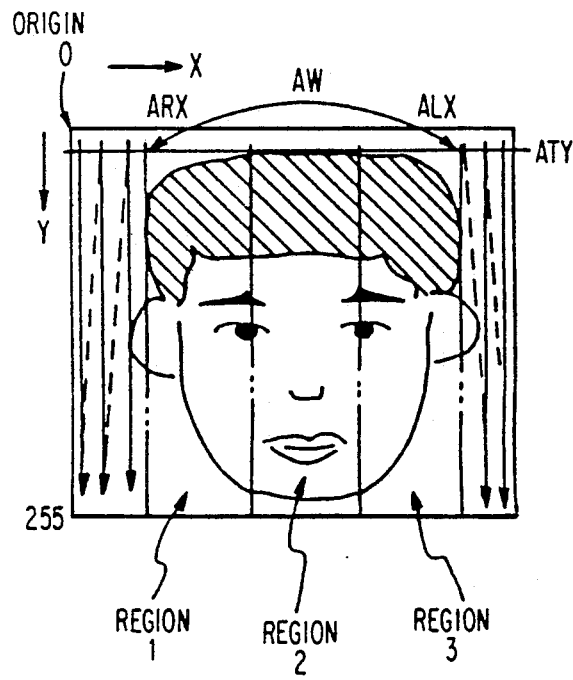

FIG. 13b is a binary-coded image formed by digitizing the image $F_{im}$ shown in FIG. 13a, using the threshold value $TH_h$ obtained in this way.

The microprocessor 6 clears the flag register (step 14), and instructs the microprocessor 8 to execute the subroutine 15 for detecting the head.

Figure 5C:
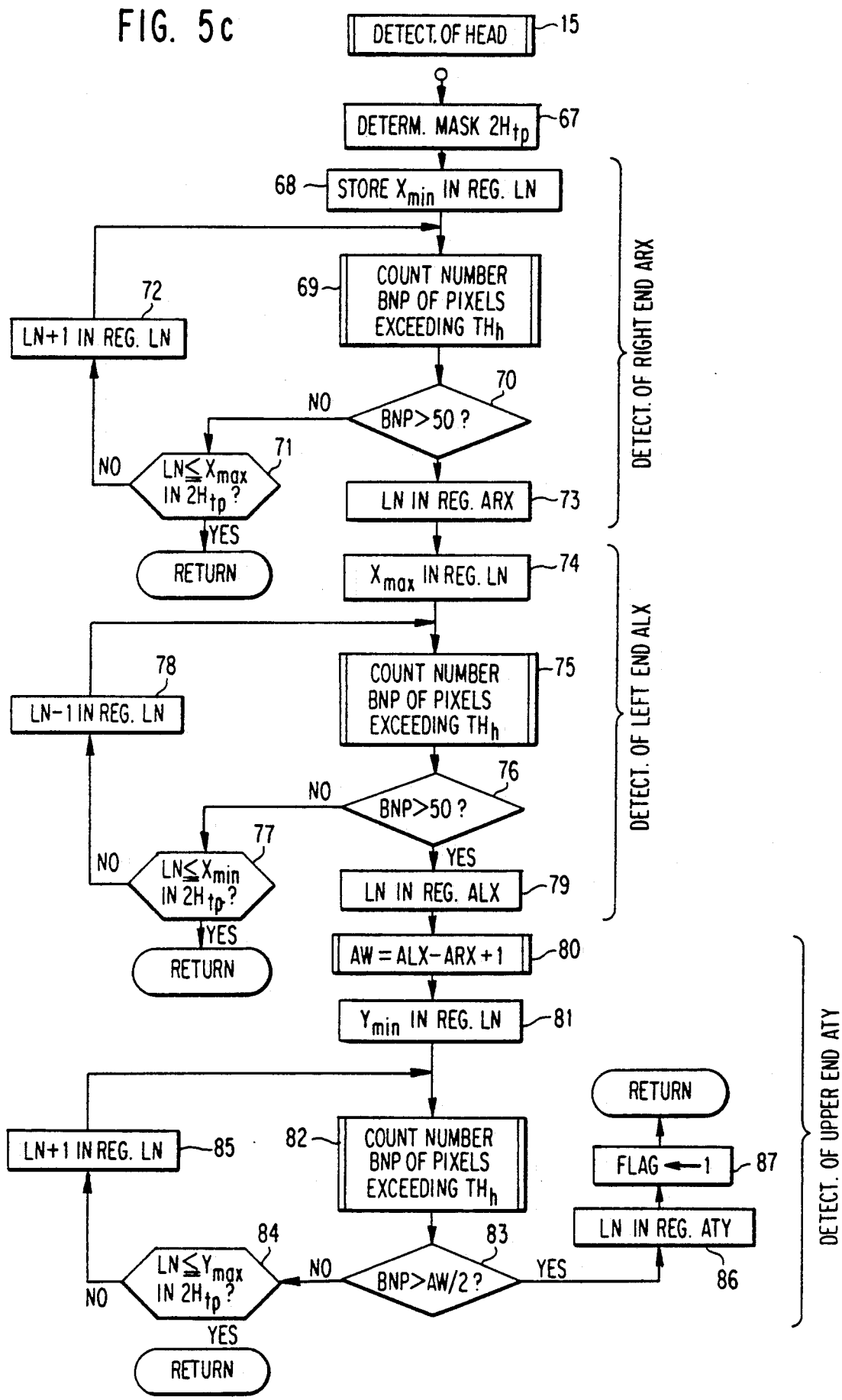

The subroutine 15 is now described in detail by referring to FIG. 5c. The microprocessor 8 forms a region $2H_{tp}$ (FIG. 13b) which is twice as wide as the region $H_{tp}$ in the feeding direction indicated by the arrow Y in an image data readout region inside the memory 13 (step 67). Data about the least address (right end) of the region $2H_{tp}$ in the main scanning direction indicated by the arrow X is stored in a line register LN (step 68) Then, data about pixels on the vertical line having an X address of LN held in the register LN is successively read from the memory 13, the vertical line extending in the direction indicated by the arrow Y. The image data ranging from level 0 indicating the highest brightness, or white, to level 255 indicating the lowest brightness, or black, is digitized, using the threshold value $TH_h$. The number of black pixels BNP having gray levels equal to or larger than $TH_h$ is counted (step 69). Then, a check is performed to see whether the number BNP exceeds 50 (step 76). If not so, a check is performed to see whether the value held in the register LN has reached the left end $X_{max}$ of the region $2H_{tp}$ (step 71). If not so, the register LN is incremented (step 72). The number of black pixels on the vertical line LN is counted (step 69). In this way, when the number BNP of black pixels on one vertical line exceeds 50, this line is regarded as indicating the right end of the head. The value presently held in the register LN is transferred to a right end register ARX (step 73). Thus, the right end position ARX of the head has been detected. The left end position ALX of the head is detected in like manner at the subsequent steps 74–70. The detected position is stored in a left end register ALX. The right end position ARX and the left end position ALX are shown in FIG. 13c.

Then, the microprocessor 8 calculates the width AW of the head according to the formula $$AW = ALX - ARX$$

The calculated width is stored in a register AW (step 80). At this time, the Y address $Y_{min}$ of the upper end of the region $2H_{tp}$ is stored in the line register LN (step 81). The number BND of black pixels on the horizontal line LN whose gray levels are equal to or larger than the threshold value $TH_h$ is counted (step 82). A check is made to see whether the number BNP exceeds AW/2. If not so, a check is performed to ascertain whether the value held in the register LN has reached the lower end position $Y_{max}$ of the region $2H_{tp}$ (step 84). If not so, the register LN is incremented (step 85). Again, the number of black pixels on the horizontal line LN is counted (step 82). When the number BNP of black pixels on one horizontal line exceeds AW/2, the line is regarded as indicating the front end of the head. The value currently held in the register LN is transferred to a front end register ATY (step 86). The microprocessor writes 1 to the flag register (step 87). The detection of the front end position ATY of the head has been completed in this way. Thereafter, the microprocessor 8 informs the microprocessor 6 that the processing is complete.

The microprocessor 6 restarts the execution of the subroutines illustrated in FIG. 5a in response to the informing signal from the microprocessor 8. A check is performed to ascertain whether the value held in the flag register is zero or not (step 16). If it is not zero, i.e., the head has been successfully detected, then the microprocessor 6 directs the microprocessor 8 to execute the subroutine 20 for determining the threshold value $TH_f$ used for detection of the forehead, the subroutine 20 being included in the process BRD (FIG. 7a) for detecting the forehead.

Figure 7B:
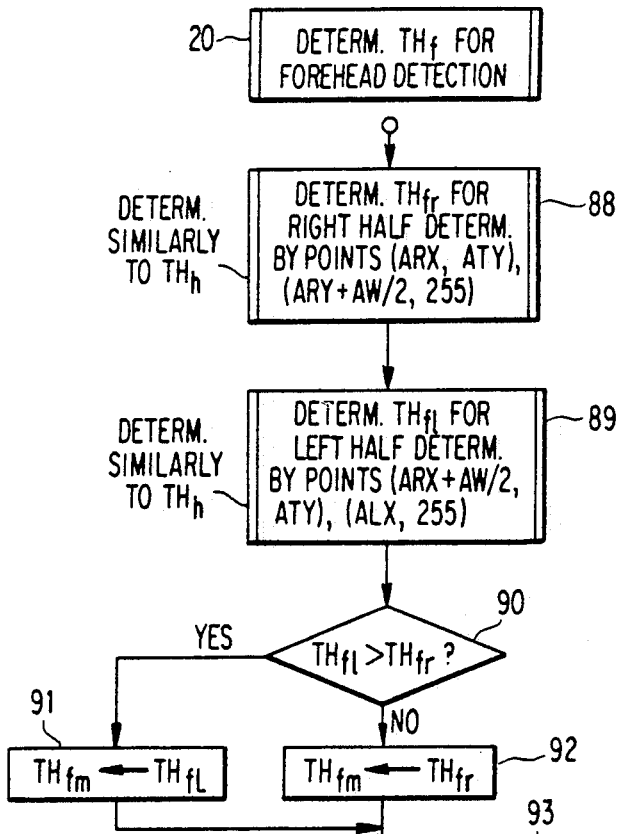
Figure 7A:
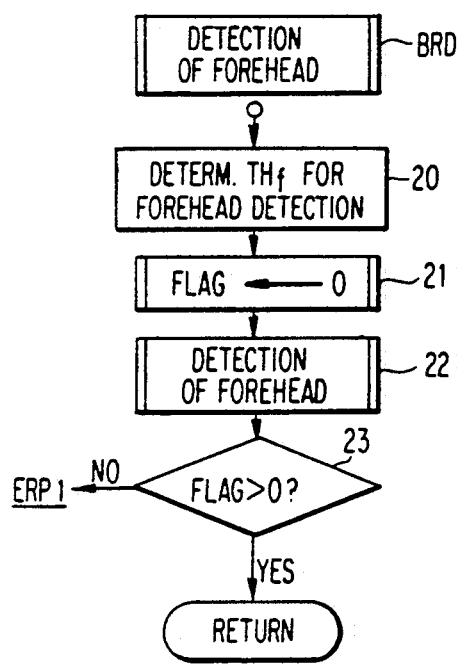

The subroutine 20 for determining the threshold value $TH_f$ used for detection of the forehead is illustrated in FIG. 7b. The microprocessor 8 carries out a subroutine 88 for creating a simple gradation histogram and calculating a threshold value $TH_{fr}$ for the right half of the range extending from position X=ARX to position X=ALX (FIG. 13c), in the same manner as the subroutine 13 for determining the threshold value $TH_h$ used for detection of head. The right half contains the position X=ARX. Then, the next subroutine 89 is effected to determine a threshold value $TH_{fL}$ for the left half containing the position X=ALX in the same way. The processor 8 compares the threshold value $TH_{fr}$ with the threshold value $TH_{fL}$ (step 90). If $TH_{fL}$ is larger than $TH_{fr}$, the threshold value $TH_{fL}$ is stored in a register $TH_{fm}$ (step 91). If $TH_{fr}$ is in excess of $TH_{fL}$, then $TH_{fr}$ is stored in the register $TH_{fm}$ (step 91). Then, the region starting with X=ARX and ending with X=ALX is divided into three regions 1–3 as shown in FIG. 13c. The threshold values $TH_{fr}$, $TH_{fm}$, $TH_{fL}$ held in the registers $TH_{fr}$, $TH_{fm}$, $TH_{fL}$, respectively, are assigned to the regions 1, 2, 3, respectively (step 93). At this time, the microprocessor 8 informs the microprocessor 6 that the processing is complete. In response to this, the microprocessor 6 clears the flag register (step 21), and instructs the microprocessor 8 to execute the subroutine 22 for detection of forehead.

Figure 13D:
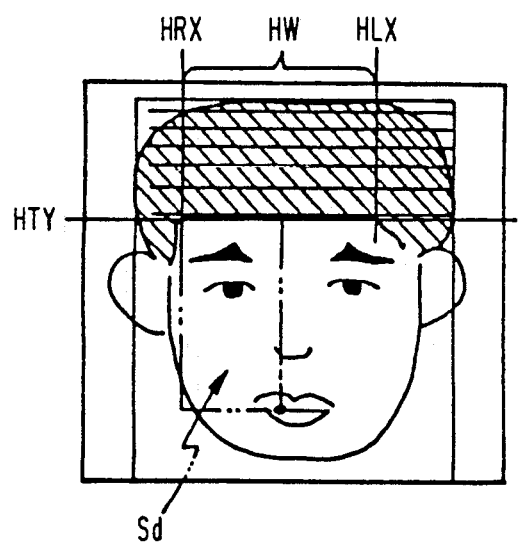

The subroutine 22 for detection of forehead is illustrated in FIG. 7c. The microprocessor 8 writes the position ATY of the front end of the head to the line register LN (step 94), and clears registers MXL, CK, and RL. Then, it writes the position ARX of the right end of the head to a register XP (step 95). Thereafter, data about pixels lying on the horizontal lines having Y address LN and within the range from ARX to ALX is successively read. The microprocessor examines to which of the regions 1-3 does each pixel belong. The image data is digitized, using a threshold value which is $TH_{fr}$, $TH_{fm}$, or $TH_{fL}$, depending on whether the pixel is located in the region 1, 2, or 3, respectively. If successive white pixels are obtained by the digitization, the run length RL is measured. The maximum value of the successive white pixels on the line LN is stored in a register MXL (steps 96, 101-112). If a black pixel appears during this process, the total count RL is compared with the maximum value held in the register MXL. If RL is larger than MXL, then RL is stored in the register MXL, thus updating it. The register PL is cleared. If white pixels appear subsequently, then measurement of the run length is started. This process is performed on the horizontal line having Y address LN from position ARX to position ALX. Upon completion of this process, it follows that the maximum value of the lengths of white successive pixels and the lengths of the black successive pixels on the horizontal line is stored in the register MXL. Then, the microprocessor 6 goes from step 96 to step 97 to perform a check to see whether the maximum run length MXL is in excess of AW/2. If not so, a check is done to ascertain whether LN has become the maximum value 255 (step 98). If not so, the register LN is incremented (step 99), followed by execution of step 95 and the subsequent steps to detect the maximum value of the run lengths of white pixels. If LN is equal to 225, it means that the detection of the forehead results in failure. Since control returns to the main routine without writing 1 to the flag register, control goes from step 23 of the main routine to step 17. If the maximum run length MXL is larger than AW/2 (step 97), then the present value of LN is regarded as indicating the upper position HTY of the forehead. The length MYL is stored in a forehead width register HW. LN is stored in a forehead position register HTY. The microprocessor writes 1 to the flag register (step 100). Upon completion of these operations, the microprocessor 8 informs the microprocessor 6 that the processing is complete. At this time, the upper position ATY of the forehead, the right end position HRX of the forehead, the left end position HLX of the forehead, the width HW of the upper end of the forehead are held in the registers HTY, HRX, HLX, HW, respectively. These positions and width are shown in FIG. 13d.

Figure 6:
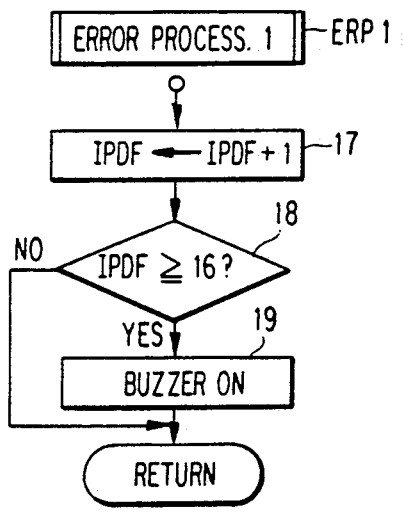

When the microprocessor 6 receives the notification of the end, it checks the contents of the flag register (step 23) (FIG. 7a) to see whether the forehead has been successfully detected. If the value held in this register is zero, i.e., failure, then control goes to step 17 (FIG. 6).

If the value held in the flag register is 1, i.e., success, then control proceeds to the subroutine RED (FIG. 8a) for detection of the right eye. The microprocessor 6 writes 0.05 and 0.4 to registers $K_1$ and $K_2$, respectively (step 24). Then, the microprocessor 6 instructs the microprocessor 8 to carry out the subroutine 25 for determining the threshold value $TH_e$ used for detection of the pupils.

Figure 8A:
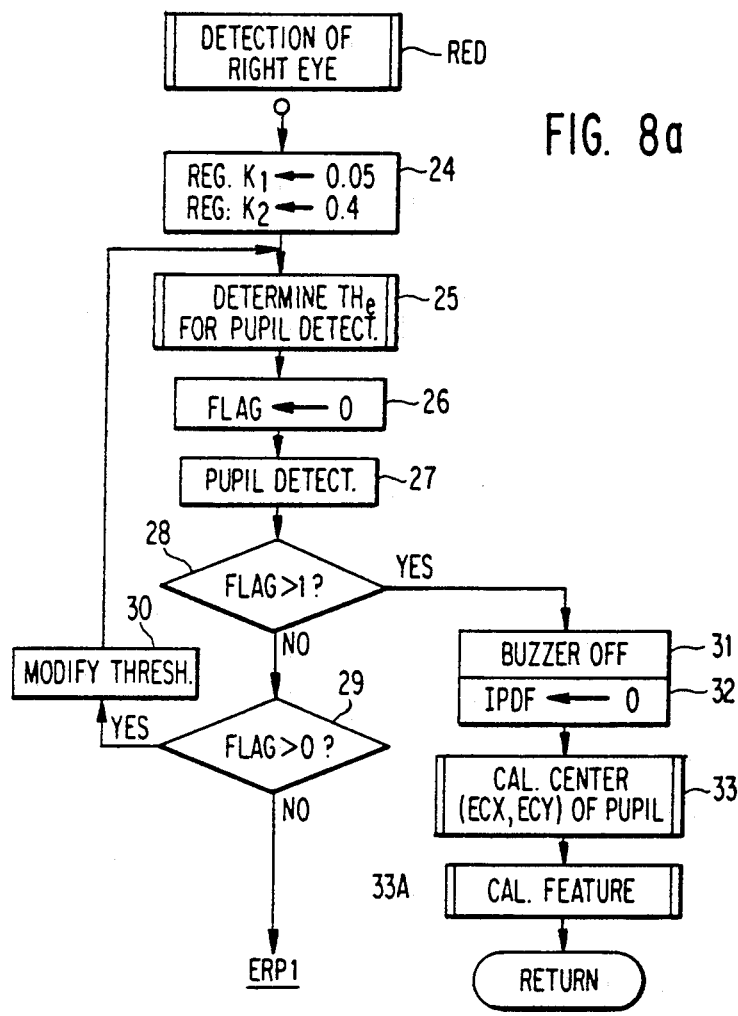
Figure 8B:
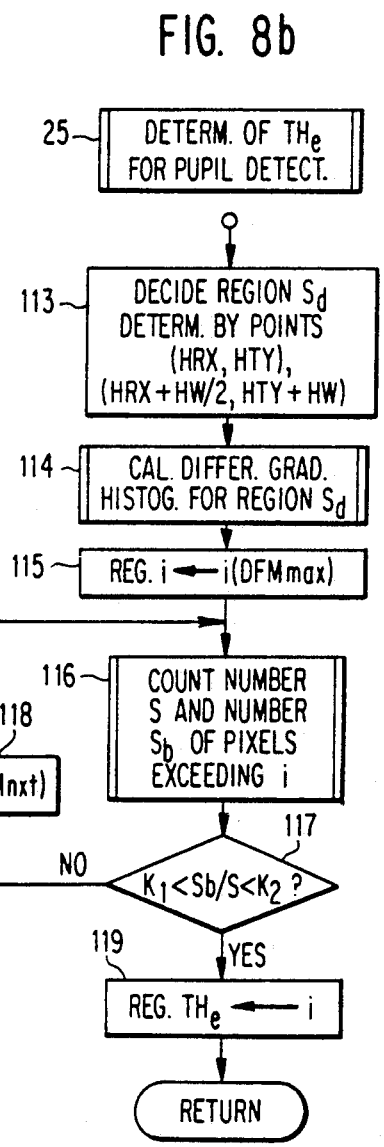

The subroutine 25 for determining the threshold value $TH_e$ for detection of the pupils is illustrated in FIG. 8b. this subroutine is performed to detect a threshold value $TH_e$ which makes the total sum of pixels defining the black edges of the eyebrows, the pupils, etc. in a region $S_d$ (FIG. 13d) of an image a given amount adequate to discriminate these pixels from other pixels. At these black edges, the gradation varies extremely. First, the microprocessor 8 defines the region $S_d$ whose two diametrically opposite edges are given by coordinates (HLX, HTY) and (HRX+HW/2, HTY +HW), respectively (step 113). Then, it creates a differential gradation histogram for the region $S_d$ (step 114). Specifically, let $n_i$ be the number of pixels having a gray level i inside the region $S_d$. The difference between the gray level i of the j-th pixel and the gray level of the (j−1)th pixel is calculated, the j-th and (j−1)th pixels being located in the same Y direction. Let $dD_j$ be this difference. For each gray level i (i=0–255), the mean square of the difference is calculated according to the formula $$DFM_i = [\Sigma(dD_j)^2]/n_i$$

It is also possible to calculate the average of the absolute values of every difference. First, the gray level i at which the mean $DFM_i$ takes its maximum value $DFM_{max}$ is used as a threshold value (step 115). The image data derived from the region $S_d$ is digitized, using this threshold value. The number of black pixels $S_b$ of the resulting pixels is counted (step 116). A check is performed to determine whether the ratio of the number of the black pixels $S_b$ to the total number S of the pixels contained in the region $S_d$ lies within a given range, i.e., $$K_1 < S_b/S < K_2$$

(step 117). $K_1$ and $K_2$ are 0.05 and 0.4, respectively, which have been set at step 24 of the subroutine illustrated in FIG. 8a. If the ratio does not lie within this range, then the gray level i is replaced by the gray level which produces the next larger mean square of the difference (step 118). Using the new gray level as a threshold value, the image data stemming from the region $S_d$ is digitized. The number S of the resulting black pixels is counted (step 116). A check is done to see whether this number S satisfies the condition $$K_1 < S_b/S < K_2$$

(step 117). If the number lies within this range, then the gray level i now held in the register i is transferred to the threshold value register $TH_e$ (step 119). Then, the microprocessor 8 informs the microprocessor 6 that the processing is complete.

The microprocessor 6 clears the flag register (step 26) (FIG. 8a), and orders the microprocessor 8 to execute the subroutine 27 for detection of the pupils.

The subroutine 27 for detection of the pupils is illustrated in FIG. 8c. The microprocessor 8 digitizes the image data derived from the region $S_d$ which extends from the upper end HTY to the lower end 255, using the threshold value $TH_e$. The dimensions of black regions consisting of the resulting pixels are calculated. A decision is made to see whether the dimensions coincide with the dimensions of human eyes. If they agree well, then 2 is written to the flag register. If they do not agree well but something resembling eyes is detected, then 1 is written to the flag register. If nothing is detected, the value held in the flag register is kept zero.

More specifically, the register CK is cleared. The line number given to the line next to the forehead line HTY is written to the line register LN (step 120). The data about the pixels on the horizontal line within the region $S_d$ is digitized, using the threshold value $TH_e$. The number BPN of the black pixels of the resulting pixels is counted (step 121). This number BPN is compared with 4 (step 122) to determine whether this line is the first line, or one end, of the black region as viewed in the Y direction. If the number is less than 4, i.e., it is not the first line, then a check is performed to ascertain whether the position of the scan made in the Y direction reaches the lower end of the region $S_d$ (step 123). If it does not reach the lower end, then the register LN is incremented (step 124). Again, the number BPN of the black pixels on the line LN is counted (step 121) and compared with 4 (step 122). If the number BPN reaches 4, then the end of a black region in the Y direction is regarded as being detected. The number BPN is written to a maximum black pixel number register MXL. A vertical width register W is cleared. LN is written to a black region upper end register TP. Also, LN is written to a black region lower end register BP (step 127). A check is performed to determine whether the position of the scan made in the Y direction reaches the lower end of the region $S_d$ (step 128). If the lower end is not reached, then the register LN is incremented (step 129). The number of black pixels is counted in the same way as at step 121 (step 130). The total count BPN is compared with 4 (step 131). If the number BPN is equal to or larger than 4, the microprocessor considers that a black region still exists on this LN line. The value held in the maximum black pixel number register MXL is compared with the number BPN (step 132). If the number BPN is larger than the held value, the number BPN is written to the register MXL, whereby the register MXL is updated (step 133). A check is performed to see whether the position of the scan made in the Y direction has reached the lower end of the region $S_d$ (step 128). If it is not reached, the number of black pixels on the next line is counted (step 129), and the total count BPN is compared with 4 (step 131) in the same manner as the foregoing. The Y coordinate of line position LN is increased in a stepwise fashion. If the number BPN becomes less than 4, the position is regarded as arriving at the lower end of one black region in the Y direction. Thus, LN is written to the lower end position register BP, and BP−TP+1 is written to the vertical width register W (step 134). A check is performed to see whether the vertical width W of the black region detected in this way is in excess of HW/20 (or exceeds it in case of pupils) or not (step 135). If so, a check is made to ascertain whether the horizontal width MXL is in excess of HW/15 (or exceeds it in case of pupils) (step 136). If so, a check is done to determine whether the ratio of the horizontal width MXL to the vertical width W is equal to or less than 3 (step 137). In case of pupils, this ratio MXL/W is 1 unless the eyelids shield the pupils. If so, the pupils are regarded as being detected. The width W is written to a pupil vertical width register EYEW, and TP is written to a pupil upper end position register ETY. The total count BP is written to a pupil upper end position register EBY, and 2 indicating that the pupils have been detected with somewhat low certainty is written to the flag register (step 138). Control then goes from step 139 to step 140, where the relation CK=0 is checked. Control proceeds to step 141, where the flag register is cleared, and 1 is written to the register CK. Likewise, the aforementioned MXL, W, TP, BP, etc. for the next horizontal line and various values of the next black regions are detected (steps 124–121, . . ., 127–137). The pupils which are detected for the first time with somewhat low certainty as mentioned previously are normally eyebrows and, therefore, when pupils are detected for the second time with somewhat low certainty, it is decided that they are pupils. For this purpose, various values for another black region located at the lower position in the Y direction are detected. In this process for detecting pupils for the second time with somewhat low certainty, various detected values are stored in the registers in the same manner as the foregoing (step 138). Control goes to step 139 and then to 140, where the relation CK=1 holds at this time. The subroutine 27 for detecting the pupils is completed. The microprocessor 8 informs the microprocessor 6 that the processing is complete. If the condition at step 137 is not met, i.e., MXL/W is in excess of 3, then it is highly probable that the eyes and/or their surroundings are continuous with the pupils or the eyebrows are continuous with the eyes, forming a large black region as shown in FIG. 13g(a) or 13h(a). In this case, since the pupils probably exist in this black region, i.e., objects resembling the pupils are detected, TP and BP are written to the pupil upper end position register ETY and the pupil lower end position register EBY, respectively. Also, 1 is written to the flag register (step 142). Control proceeds to step 139 and then to step 124.

When the total count BPN of the black pixels is less than 4 and the position of the scan made in the Y direction reaches the lower end (HTY+HW) of the region $S_d$, steps 122 and 123 are carried out. Then, control goes to step 125, where a check is performed to ascertain whether the value held in the register CK is 1. If so, it follows that the pupils were detected for the first time with somewhat low certainty, i.e., steps 137, 138, 139, 140, 141 were executed. However, a second similar detection was not made and so the values detected first should be treated as values indicating the pupils. For this purpose, 2 is again written to the flag register (step 126). Then, this subroutine 27 is ended. If the value held in the register CK is not 1, then the value held in the flag register is either 0, i.e., unsuccessful detection, or 1, i.e., pupils are detected with low certainty, as shown in FIG. 13g(a) or 13(h). At this time, the subroutine 27 is completed. Then, the microprocessor 8 informs the microprocessor 6 that the processing is complete.

In response to this, the microprocessor 6 checks the contents of the flag register (steps 28, 29) (FIG. 8a). If the value held in this register is 1, a subroutine 30 for modifying the threshold values is carried out to obtain a binary-coded image in which the shape of the pupils is shown more clearly. The subroutine 30 is illustrated in FIG. 8d. Specifically, the value held in the register $K_1$ is multiplied by 0.7, and the product is stored in the register $K_1$, thus updating it. The value held in the register $K_2$ is multiplied by 0.7, and the product is written to the register $K_2$ to thereby update it (step 143). Then, control returns to the subroutine illustrated in FIG. 8a. The subroutine 25 for determining the threshold value $TH_e$ used for detection of pupils is carried out (step 25). The subroutines 25 is illustrated in FIG. 8b. The values of $K_1$ and $K_2$ used at step 117 are 0.7 times as large as the previous values and so the threshold value $TH_e$ determined at this time is larger than the previous threshold value. The subroutine 27 for detecting the pupils is carried out to digitize the image data derived from the region $S_d$. As a result, the area of each black region decreases. As an example, a black region around an eye is shaped like an eye as shown in FIG. 13g(b) or 13h(b). Accordingly, it is highly probable that 2 is written to the flag register. Also during the present execution of the subroutine 27 for detecting the pupils, if 1 is written to the flag register, the subroutine 30 for modifying the threshold values, the subroutine 25 for determining the threshold value $TH_e$ used for detection of the pupils, and the subroutine 27 for detecting the pupils are executed.

Figure 13E:
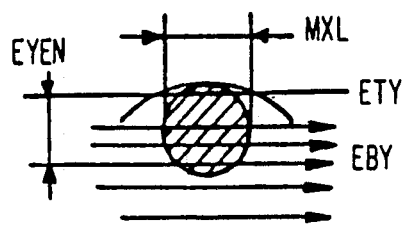

FIG. 13e shows the relation of the shape of a pupil to the detected values. FIG. 13d shows the region of the right eye which is defined by values already detected.

Figure 13F:
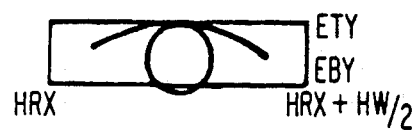
Figure 13G:
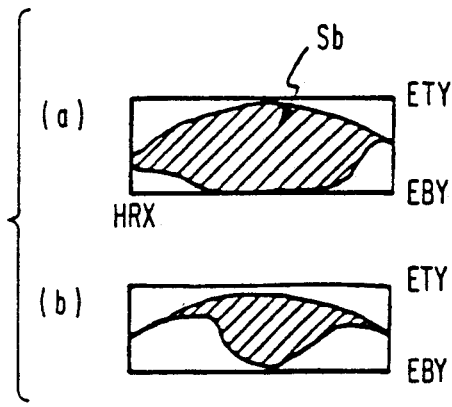
Figure 13H:
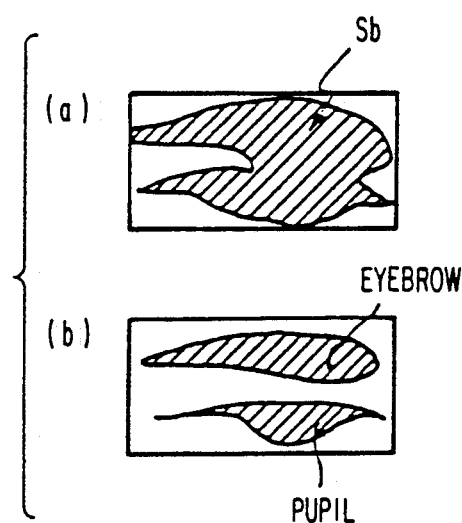
Figure 13I:
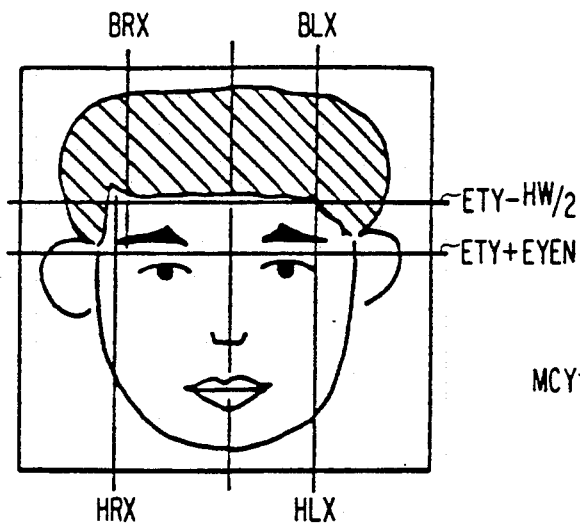
Figure 13J:
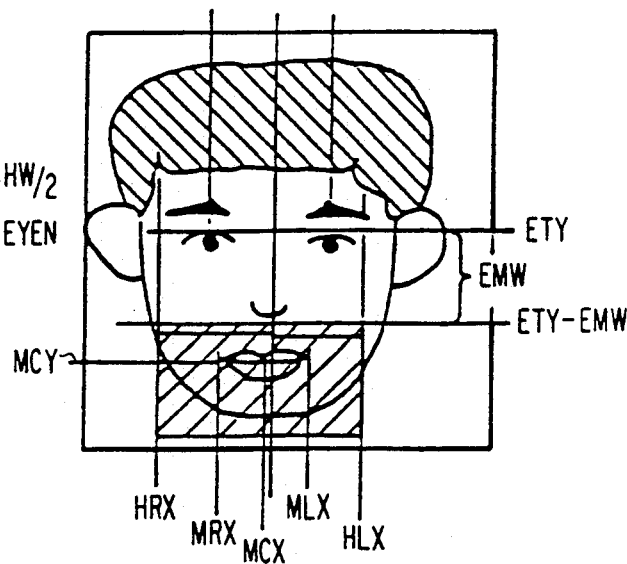

When 2 is written to the flag register during the execution of the subroutine 27 for detecting the pupils, the microprocessor 6 causes the buzzer controller 30 not to operate the buzzer (step 31), and clears the error count register IPDF (step 32). The central position (EXC, ECY) of the pupil of the detected right eye is calculated in a subroutine 33. In particular, the rectangular region shown in FIG. 13f is regarded as the region of the right eye. Two diametrically opposite corners of this rectangular region have coordinates (HRX, ETY) and (HRX±HW/2, EBY), respectively. The data obtained from this region is digitized, using the threshold value $TH_e$. Then, the digitized data is supplied to the microprocessor 8, which then calculates the center of gravity, i.e., the center of the distribution of the black pixels. The microprocessor 6 receives data about the center of gravity and converts it into addresses on the frame of image. The central position obtained in this way is given by X=ECX and Y=ECY.

Then, the microprocessor 6 forces the microprocessor 8 to execute the subroutine 33A for calculating a feature. In particular, the microprocessor 8 counts the number of successive black pixels around a pupil and measures the run length. The run length is written to a given register.

Subsequently, the microprocessor 6 goes to the subroutine 34 of the main routine (FIG. 2) to set the window $W_e$ (FIGS. 15a-15f) which defines a scanning region about the center (ECX, ECY) for search for a pupil (step 34). The X coordinates of the region of the window range from $ECX-k_1$ to $ECX+k_1$, and the Y coordinates of the region range from $EXY-k_2$ to $EXY+k_2$, where $k_1$ and $k_2$ are constants. These coordinates are stored in a memory. The area of the window $W_e$ is very small as compared with the area of one frame.

Then, opposite ends BRX, BLX (FIG. 13i) of the eyebrows are detected (step 35)(FIG. 2). In this example, electrical devices are not controlled according to the shape and the positions of the eyebrows, but if necessary, the devices may be controlled. In order to determine the range of scan used for detection of the mouth region, however, such a control operation is performed. During the execution of the subroutine 35 for detecting the opposite ends (BRX, BLX) of the eyebrows, the scan is made from HRX to HLX in the X direction and from ETY−HW/2 to ETY−EYEW in the Y direction. The scanning line is horizontal, or lies in the X direction. Whenever a scan is made along each scanning line within the range, the number of black pixels is counted. The X address BRX of the black pixel at the right end of the line having the maximum number of black pixels is regarded as representing the right end. The X address BLX of the black pixel at the left end is regarded as representing the left end. These addresses are stored in the memory. If this detection results in failure, control goes to the subroutine 17 (FIG. 6) for error processing 1 (ERP).

Control then proceeds to the subroutine MOD (FIG. 2) for detection of the mouth. A scanning region used for detection of the mouth is calculated. A threshold value for this region is determined. It is decided that the X coordinates of the scanning region range from BRX to BLX and the Y coordinates range from ETY−EMW to 255 (the lower end of the frame), where EMW is a constant. The threshold value $TH_m$ for the scanning region is set in the same manner as in the subroutine 25, where a differential gradation histogram is created to determine the threshold value. The mouth is detected in the same way as in the subroutine 27 for detection of pupils. If the mouth cannot be detected with certainty, a threshold value which enables certain detection is determined in the same manner as in the subroutine 30 for modifying the threshold values.

The image data obtained from the region (BRX to BLX, ETY−EMW to 255) is digitized, using the threshold value $TH_m$. The binary-coded image is scanned from a starting point (X=BRX, Y=ETY−EMW) horizontally, or in the X direction. Each time a line is scanned, the number of black pixels is counted and compared with the maximum value held in the register. If the newest total count is larger than the held value, then the newest count is written to the register. If the number counted latest is larger than the number counted previously, then the next line is scanned. If the latest number is smaller than the held value, then the previous line is regarded as extending over the horizontal line through the mouth, or the contact line between the upper lip and the lower lip. The Y address MCY (FIG. 13j) of the previous line is taken as the Y address of the center of the mouth and stored in the memory. The intermediate value MCX between the starting point and the end point of the black region on the line is taken as the X address of the mouth and stored in the memory. That is, the center (MCX, MCY) of the mouth is found. Then, the number of successive black pixels is counted. Also, the length of the periphery of the black region is measured. These values are written to given registers. If the detection ends in failure, control goes to step 17 illustrated in FIG. 6.

Figure 16A:
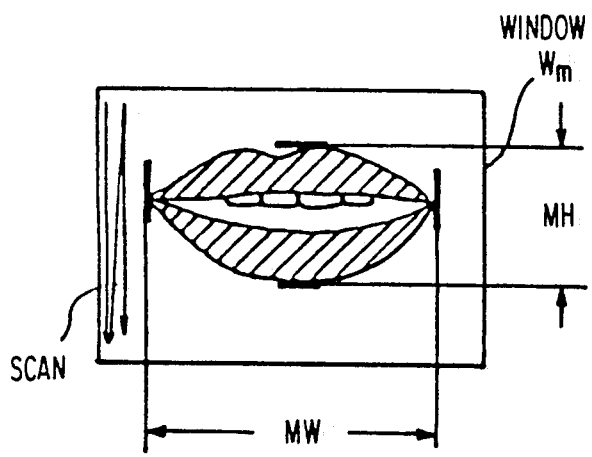
FIG. 16a is a plan view of a window region $W_m$ formed for searching for a mouth and a detected mouth.

The microprocessor 6 then sets the window $W_m$ (FIG. 16a) to define a scanning region about the center (MCX, MCY) for search for the mouth (step 39). The X coordinates of the window $W_m$ range from $MCX-k_3$ to $MCX+k_3$, and the Y coordinates range from $MCY-k_4$ to $MCY+k_4$, where $k_3$ and $k_4$ are constants. These values are stored in the memory. This window $W_m$ is very small as compared with the area of one frame of image. The microprocessor 6 then executes the subroutine NOD for detecting the nose. This subroutine is similar to the subroutine MOD for detection of the mouth.

In this example, the face and the elements of the face, i.e., the left pupil, the right pupil, the mouth, and the nose, have been detected in this way. To make sure of them, the subroutine (FAD) for checking the detection of the face is carried out. More specifically, we examined the characteristic quantities of the faces of the inventor and his male acquaintances. The results are shown in Table 1.

TABLE 1

| element of face | characteristic quantity | mean M | variance | standard deviation |
|---|---|---|---|---|
| hair | width | 2.759 | 0.0549 | 0.234 |
|  | distance from pupils to upper end of hair | 1.531 | 0.0364 | 0.191 |
| left and right eyebrows | area | 0.017 | 0.0001 | 0.011 |
|  | aspect ratio | 4.055 | 2.8600 | 1.691 |
|  | degree of complexity* | 28.201 | 82.2770 | 9.071 |
|  | space between both | 0.984 | 0.0065 | 0.080 |
| left and right pupils | area | 0.300 | 0.0000 | 0.004 |
|  | aspect ratio | 4.142 | 0.1326 | 0.364 |
|  | degree of complexity* | 34.054 | 28.0640 | 5.298 |
|  | distance to eyebrows | 0.273 | 0.0007 | 0.027 |
|  | distance to nostrils | 0.608 | 0.0023 | 0.048 |
|  | distance from upper end of hair | 1.531 | 0.0364 | 0.191 |
| mouth | area | 0.038 | 0.0002 | 0.016 |
|  | aspect ratio | 9.984 | 8.6230 | 2.936 |
|  | degree of complexity* | 78.184 | 612.6630 | 24.752 |
|  | distance to nostrils | 0.340 | 0.0015 | 0.038 |
|  | distance to pupils | 0.948 | 0.0034 | 0.058 |

Note:
degree of complexity* = (peripheral length)$^2$/area. The values were calculated, using values which were obtained by normalizing the distances with the space between the pupils. Therefore, the space EW between the pupils is 1.

Figure 14:
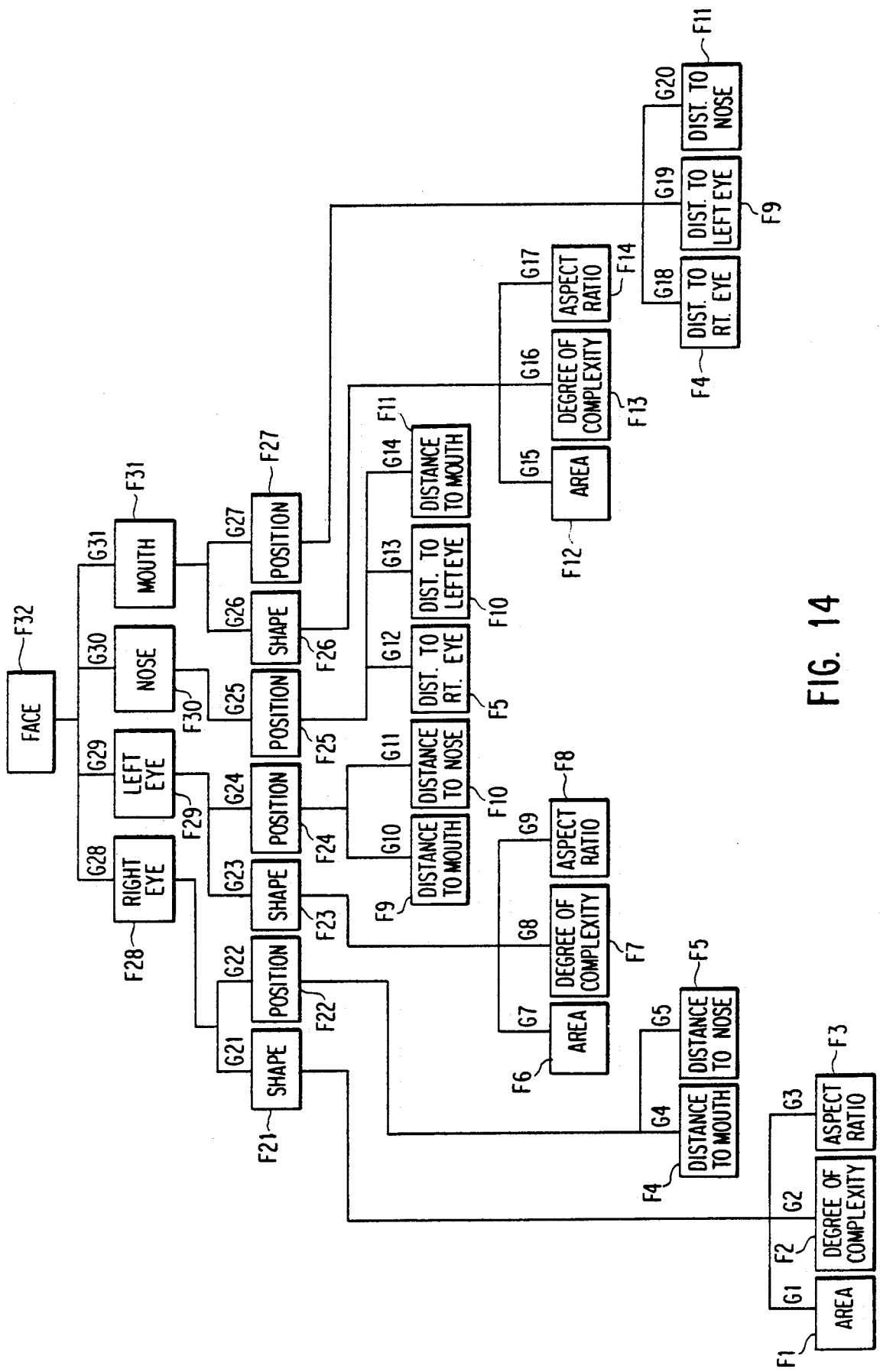
FIG. 14 is a diagram showing the relations between the degrees of similarity $F_1$–$F_{14}$ and the degrees of certitude $F_{21}$–$F_{32}$ calculated in the routine (FAD) illustrated in FIG. 9a for checking detection of a face.

In the present example, the statistics of the parameters shown in the lower part of FIG. 14 were taken for inventor's acquaintances. The mean values M ($M_1$–$M_{20}$) of the parameters and the standard deviations $\sigma$ ($\sigma_1$–$\sigma_{20}$) were calculated. These values were stored in the ROM 9 as reference values.

Figure 9A:
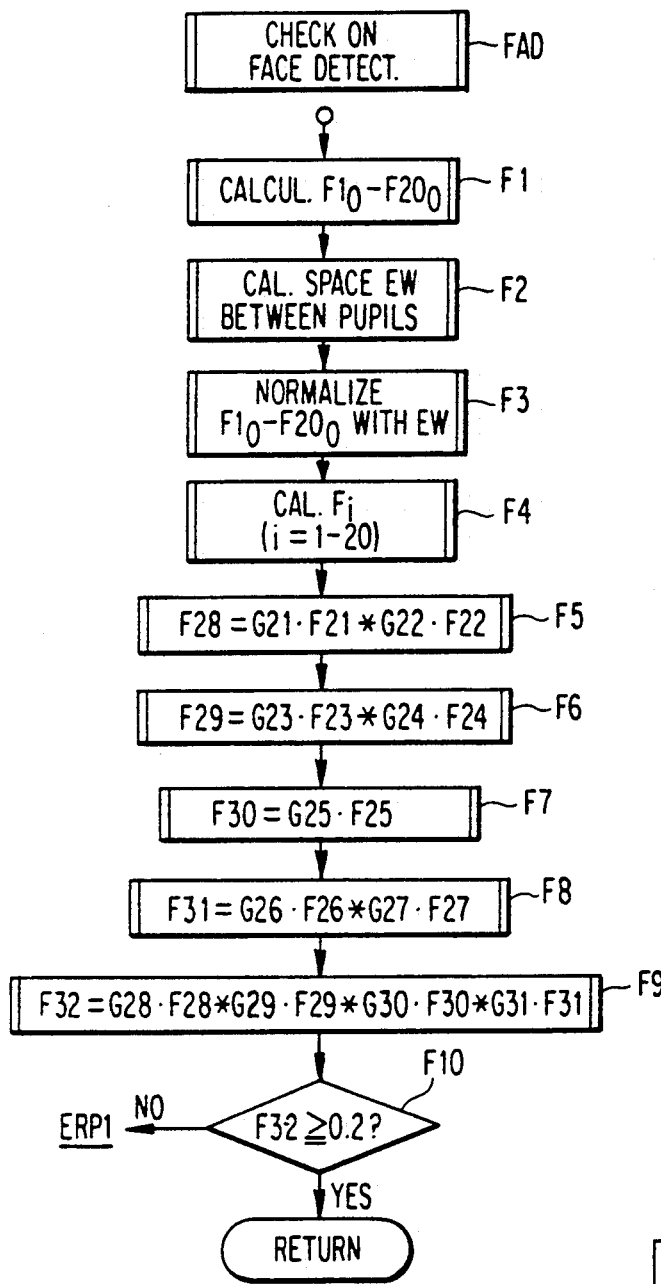

The subroutine (FAD) for checking the detection of the face is now described by referring to FIG. 9a. The microprocessor 8 calculates data used to compute the parameters shown in the lower part of FIG. 14, using the data about the positions and the shapes obtained by detecting the aforementioned elements of the face, i.e., the left pupil, the right pupil, the mouth, and the nose (step F1). The space EW between the pupils which was calculated at step F1 is normalized (step F3). In this way, data about the parameters which are unaffected by the distance between the driver's face and the camera 3 is obtained.

Subsequently, the microprocessor 8 calculates the degrees of similarity $F_i$ (i=1–14) from the normalized data. Each degree of similarity indicates to what degree a detected element resembles the statistically standard, corresponding element given by the reference value stored in the ROM 9 (step F4).

Figure 9C:
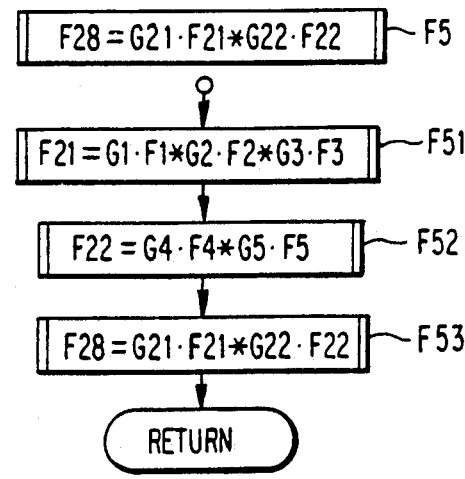
Figure 9B:
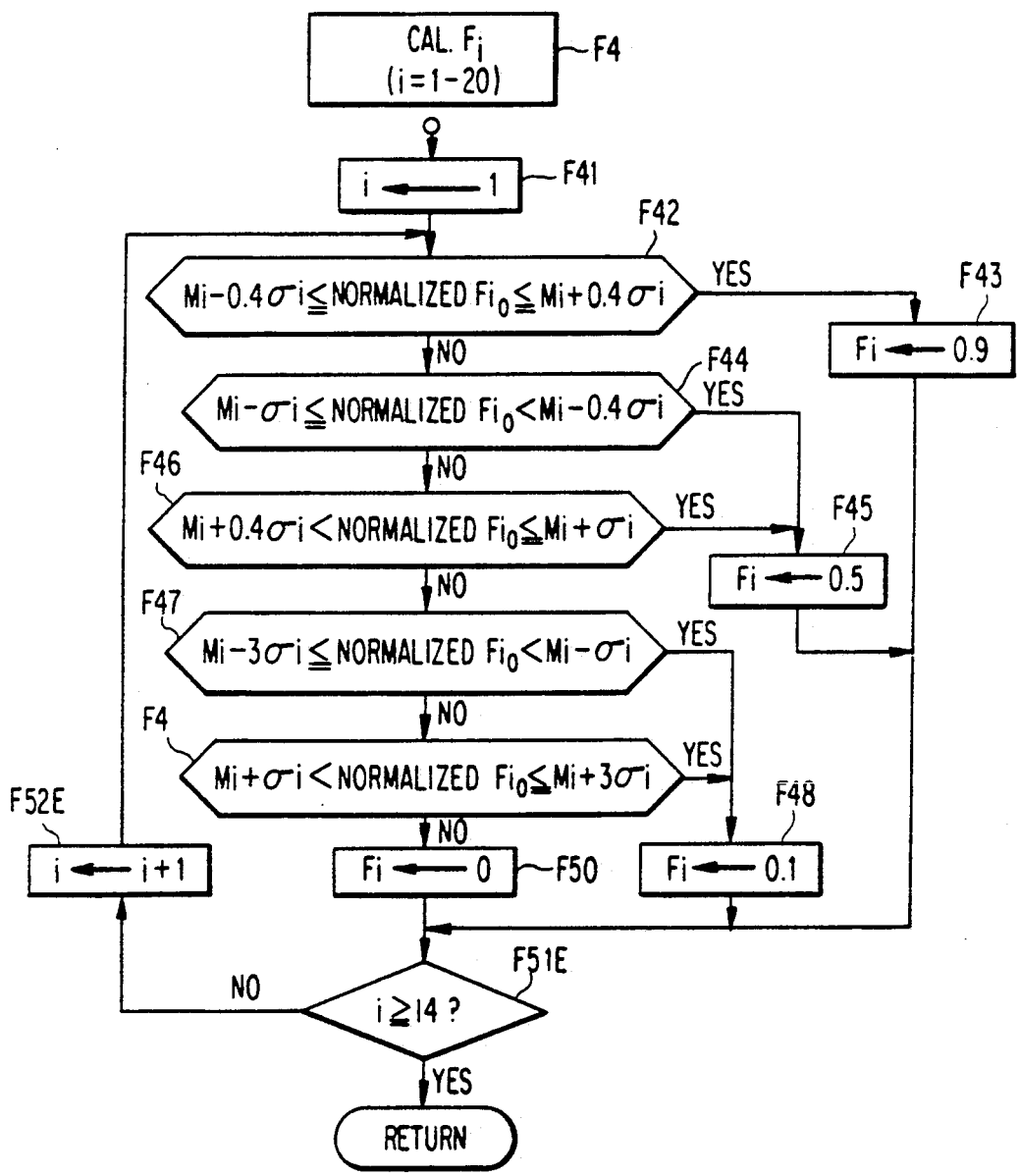

This calculation is particularly illustrated in FIG. 9b. First, parameter 1 indicating the area of the right eye including black pixels continuous with the black pixels on the right eye is selected (step F41). Correspondingly, $M_1$ and $\sigma_1$ are selected as reference values. A decision is made to see where the normalized number $Fl_0$ of the black pixels on the right eye is located within the statistical distribution, say a Gaussian distribution, of the mean $M_1$ and the standard deviation $\sigma_1$. $Fl_0$ is the number of the detected black pixels on the right pupil including black pixels continuous with them. A central region about $M_1$ is given by $$M_1 - 0.4\sigma_1 \leq normalized\ Fl_0 \leq M_1 + 0.4\sigma_1$$

If the normalized $Fl_0$ lies within this central region, then the degree of similarity F1 of the area of the right eye is set to 0.0 (steps F42 and F43). If it lies either within a region which is slightly remote from $M_1$ and given by $$M_1 - \sigma_1 \leq normalized\ Fl_0 \leq M_1 - 0.4\sigma_1$$

or within another slightly remote region given by $$M_1 + 0.4\sigma_1 < normalized\ Fl_0 M_1 + \sigma_1$$

, then the degree of similarity F1 of the area of the right eye is set to 0.5 (steps F44–F46). If it is situated either in a region which is remoter from $M_1$ and given by $$M_1 - 3\sigma_1 \leq normalized\ Fl_0 \leq M_1 - \sigma_1$$

or in another region which is remoter from $M_1$ and given by $$M_1\sigma_1 \leq normalized\ Fl_0 \leq M_1 + 3\sigma_1$$

, then the degree of similarity $F_1$ of the area of the right eye is set to 0.1 (steps F47–F49). If it lies within a further remote region, the degree of similarity $F_1$ of the area of the right eye is set to 0 (step F50).

After setting the degree of similarity $F_1$ of the area of the right eye in this way, the degree of similarity $F_2$ of the right eye in a manner similar to the foregoing process except that i=2 (steps F51E and F52E). Similarly, $F_3$–$F_{13}$ are computed. Finally, the degree of similarity $F_{14}$ of the aspect ratio of the mouth is determined.

After determining the degrees of similarity $F_1$–$F_{14}$ of the parameters of the elements in this manner, the microprocessor 8 calculates the degree of certitude $F_{28}$ of each parameter of the right eye (step F5)(FIG. 9a), calculates the degree of certitude $F_{29}$ of each parameter of the left eye (step F6), calculates the degree of certitude $F_{30}$ of each parameter of the nose (step F7), and calculates the degree of certitude $F_{31}$ of each parameter of the mouth (step F8).

As illustrated in FIG. 14, the degrees of certitude of the right eye, the left right, and the mouth are combinations of the degrees of certitude of the shapes, or geometrical features, and the degrees of certitude of the relative positions. The degree of certitude of the nose is the degree of certitude of the relative position. The degree of certitude of the shape of the right eye can be the degree of similarity of the area, or a combination of the degree of similarity of the degree of complexity and the degree of similarity of the aspect ratio. In this way, degrees of certitude are combinations of degrees of similarity of various parameters. $G_1$–$G_{31}$ are weight coefficients.

The process F5 for calculating the degree of certitude $F_{28}$ of the right eye is illustrated in FIG. 9c. The degree of similarity $F_1$ of the area, the degree of similarity $F_2$ of the degree of complexity, and the degree of similarity $F_3$ of the aspect ratio are multiplied by weight coefficients $G_1$, $G_2$, $G_3$, respectively. A combination $F_{21}$ of these products is calculated (step F51). The step F51 for calculating the combination $F_{21}$ is particularly illustrated in FIG. 9d and described later. Likewise, the microprocessor 8 computes the degree of certitude $F_{22}$ of the position of the right eye by combining the degree of similarity $F_4$ of the distance between the mouth and the right pupil with the degree of similarity $F_5$ of the distance between the nose and the right pupil (step F52). Then, it calculates the degree of certitude $F_{28}$ of the right eye by combining the degree of certitude $F_{21}$ of the shape, or the geometrical feature, of the right eye with the degree of certitude $F_{22}$ of the relative positions of the elements (step F53).

Figure 9D:
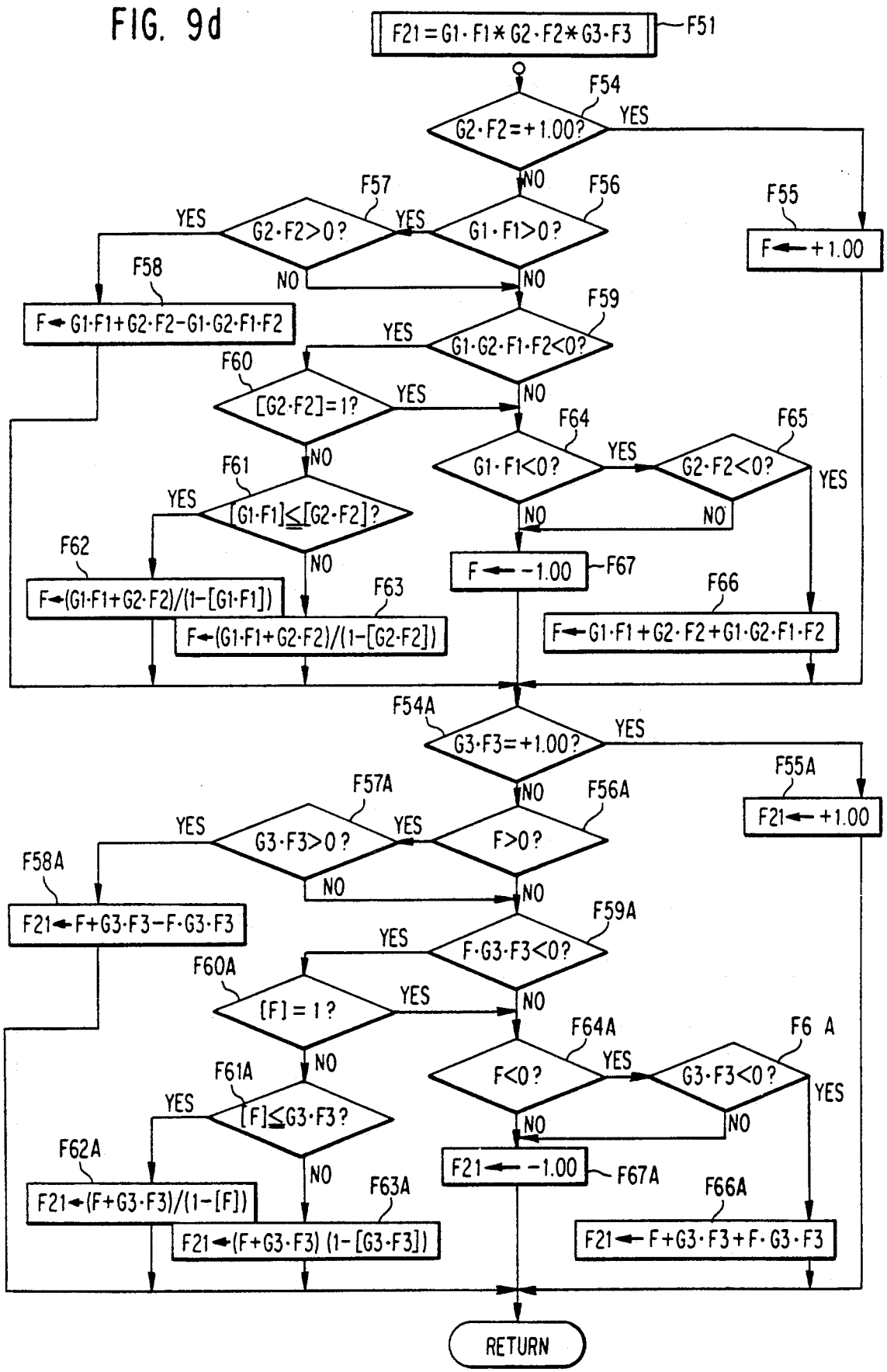

To understand the manner in which combinations are calculated, the method (F51) of calculating the degree of certitude $F_{21}$ is next described by referring to FIG. 9d. Other combinations are similarly calculated.

Referring to FIG. 9d, a combination F of $G_1 \cdot F_1$ and $G_2 \cdot F_2$ is calculated (F=$G_1 \cdot F_1 * G_2 \cdot F_2$) (steps F54–F67). A combination $F_{21}$ of this F and $G_3 \cdot F_3$ is calculated ($F_{21}$=F*$G_3 \cdot F_3$) (step F54A–F67A). Since F and $F_{21}$ are calculated in the same manner, only F=$G_1 \cdot F_1 * G_2 \cdot F_2$ of steps F54–F67 is next described.

A check is performed to see whether $G_2 \cdot F_2$ is equal to +1.00 (step F54). If so, F is set to +1.00 (step F55). If not so, a check is made to ascertain whether $G_1 \cdot F_1$ and $G_2 \cdot F_2$ are both positive (steps F56, F57). If so, F is set to $[G_1 \cdot F_1 + G_2 \cdot F_2 - G_1 \cdot F_1 \cdot G_2 \cdot F_2]$ (step F58). If any one of them is equal to or less than 0, a check is done to determine whether any one of them is 0 (step F59). If not 0, a check is performed to see if the absolute value of $G_2 \cdot F_2$ is 1 (step F60). If so and $G_1 \cdot F_1$ is less than 0, then F is set to $-1.00$ (steps F64, F67). If it is equal to or larger than 0, a check is performed to see whether $G_2 \cdot F_2$ is less than 0. If so, F is set to $[G_1 \cdot F_1 + G_2 \cdot F_2 + G_1 \cdot F_1 \cdot G_2 \cdot F_2]$ (step F66). If not so, F is set to $-1.00$ (step F67).

A check was made to see whether the absolute valve of $G_2 \cdot F_2$ was 1 (step 60). If not so, a check is performed to determine which of the absolute value of $G_1 \cdot F_1$ and the absolute value of $G_2 \cdot F_2$ is larger. If the former absolute value is larger, F is set to $$(G_1 \cdot F_1 + G_2 \cdot F_2)/(1 - |G_2 \cdot F_2|)$$

If the absolute value of $G_2 \cdot F_2$ is larger, F is set to $$(G_1 \cdot F_1 + G_2 \cdot F_2)(1 - |G_1 \cdot F_1|)$$

Thus, F=$G_1 \cdot F_1 * G_2 \cdot F_2$ has been computed. $F_{21}$=F*$G_3 \cdot F_3$ is calculated at the next steps F54A–F67A. This series of arithmetic operations is similar to the above-described series of arithmetic operations except that $G_1 \cdot F_1$ is replaced by F and that $G_2 \cdot F_2$ is replaced by $G_3 \cdot F_3$. Other combinations are calculated in like manner.

Referring again to FIG. 9a, after calculating the degree of certitude $F_{28}$ of the existence of the right eye, the degree of certitude $F_{29}$ of the existence of the left eye, the degree of certitude $F_{30}$ of the existence of the nose, and the degree of certitude $F_{31}$ of the existence of the mouth are calculated as mentioned already, combinations of these degrees are calculated to obtain the degree of certitude $F_{32}$ of detection of the face (step F9). This degree of certitude $F_{32}$ lies in the range from 0 to 1. As the degree of certitude increases, the possibility that the image formed by the TV camera 3 is a human face and the detected elements are correct becomes higher. As the degree decreases, the possibility that a human face is not detected and the detected elements are not correct, e.g., an eyebrow is detected as a pupil, becomes higher.

The degree of certitude $F_{32}$ of the face is compared with 0.2 (step F10). If the degree $F_{32}$ is equal to or larger than 0.2, the face and the elements are regarded as being detected correctly. Then, control goes to step 40 of the main routine (FIG. 2). If the degree $F_{32}$ is less than 0.2, the detection is regarded as erroneous. In this case, control proceeds to the subroutine (ERP1) for

TABLE 2

| | degree of similarity | | | degree of certitude 1 | | | degree of certitude 2 | | degree of certitude 3 |
|---|---|---|---|---|---|---|---|---|---|
| | symbol | value | item | symbol | value | item | symbol | value | |
| right eye | $F_1$ | 0.50 0 | shape | $F_{21}$ | 0.52 0.16 | existence | $F_{28}$ | 0.41 0.04 | degree of certitude to which face is correctly detected $F_{32}$ 0.42 0.11 |
| | $F_2$ | 0.50 0.50 | position | $F_{22}$ | 0.44 0 | | | | |
| | $F_3$ | 0.90 0 | | | | | | | |
| | $F_4$ | 0.50 0 | | | | | | | |
| | $F_5$ | 0.50 0 | | | | | | | |

($F_1$: area; $F_2$: degree of complexity; $F_3$: aspect ratio; $F_4$: distance to mouth; $F_5$: distance to nose)

| left eye | $F_6$ | 0 0 | shape | $F_{23}$ | 0.32 0 | existence | $F_{29}$ | 0.54 0 | |
| --- | --- | --- | --- | --- | --- | --- | --- | --- | --- |
| | $F_7$ | 0.10 0 | position | $F_{24}$ | 0.70 0 | | | | |
| | $F_8$ | 0.90 0 | | | | | | | |
| | $F_9$ | 0.90 0 | | | | | | | |
| | $F_{10}$ | 0.90 0 | | | | | | | |

($F_6$: area; $F_7$: degree of complexity; $F_8$: aspect ratio; $F_9$: distance to mouth; $F_{10}$: distance to nose)

| nose | $F_5$ | 0.50 0 | position | $F_{25}$ | 0.59 0.16 | existence | $F_{30}$ | 0.53 0.14 | |
| --- | --- | --- | --- | --- | --- | --- | --- | --- | --- |
| | $F_{10}$ | 0.90 0 | | | | | | | |
| | $F_{11}$ | 0.90 0.90 | | | | | | | |

($F_5$: distance to right eye; $F_{10}$: distance to left eye; $F_{11}$: distance to mouth)

| mouth | $F_{12}$ | 0.50 0.50 | position | $F_{26}$ | 0.43 0.43 | existence | $F_{31}$ | 0.49 0.22 | |
| --- | --- | --- | --- | --- | --- | --- | --- | --- | --- |
| | $F_{13}$ | 0.10 0.10 | | | | | | | |
| | $F_{14}$ | 0.90 | | | | | | | |

TABLE 2-continued

| degree of similarity | | degree of certitude 1 | | | degree of certitude 2 | | | degree of certitude 3 |
|---|---|---|---|---|---|---|---|---|
| symbol | value | item | symbol | value | item | symbol | value | |
| | 0.90 | | | | | | | |
| $F_4$ | 0.50 | position | $F_{27}$ | 0.59 | | | | |
| | 0.50 | | | 0.16 | | | | |
| $F_9$ | 0.90 | | | | | | | |
| | 0 | | | | | | | |
| $F_{11}$ | 0.90 | | | | | | | |
| | 0.90 | | | | | | | |

($F_{12}$: area: $F_{13}$: degree of complexity; $F_{14}$: aspect ratio: $F_4$: distance to right eye: $F_9$: distance to left eye; $F_{11}$: distance to nose)

error processing 1.

One example of the calculated degrees of similarity $F_1$–$F_{14}$ and degrees of certitude $F_{21}$–$F_{31}$ is shown in Table 2. Note that the upper portion of each column of Table 2 indicates the case where an actual pupil is detected as a pupil and that the lower portion indicates the case where an eyebrow is detected as a pupil.

In the example illustrated in Table 2, $F_{32}=0.42$ when an actual pupil is detected as a pupil. The result of the decision made at the step F10 of the subroutine (FAD) (FIG. 9a) for checking detection of the face is that the face has been correctly detected. Then, control goes to step 40 of the main routine (FIG. 2). If an eyebrow is detected as a pupil, $F_{32}=0.11$. The result of the decision made at step F10 is that the detection is erroneous. Control goes Lo the subroutine (ERP1) for error processing 1. In this subroutine, a given processing is performed. Then, the aforementioned series of operations beginning with the subroutine (IPD) for judging the input mode and ending with the subroutine (NOD) for detection of the nose is carried out. Thereafter, the subroutine (FAD) for checking the detection of the face is effected.

If the result of the decision made at the subroutine (FAD) for checking the detection of the face is that the face has been correctly detected, the microprocessor 6 writes data about a new frame of image to the memory 13 (step 40). The data is digitized and written to the memory 11. During this process, data obtained from the region of the window $W_e$ is digitized, using the aforementioned threshold value $TH_e$. Data derived from the region of the window $W_m$ is digitized, employing the threshold value $TH_m$.

After the digitization process, the subroutine 44 for search for pupils is executed provided that the switch 5E is closed. Also, the subroutine 51 for search for mouth is carried out provided that the switch 5M is closed.

Figure 10A:
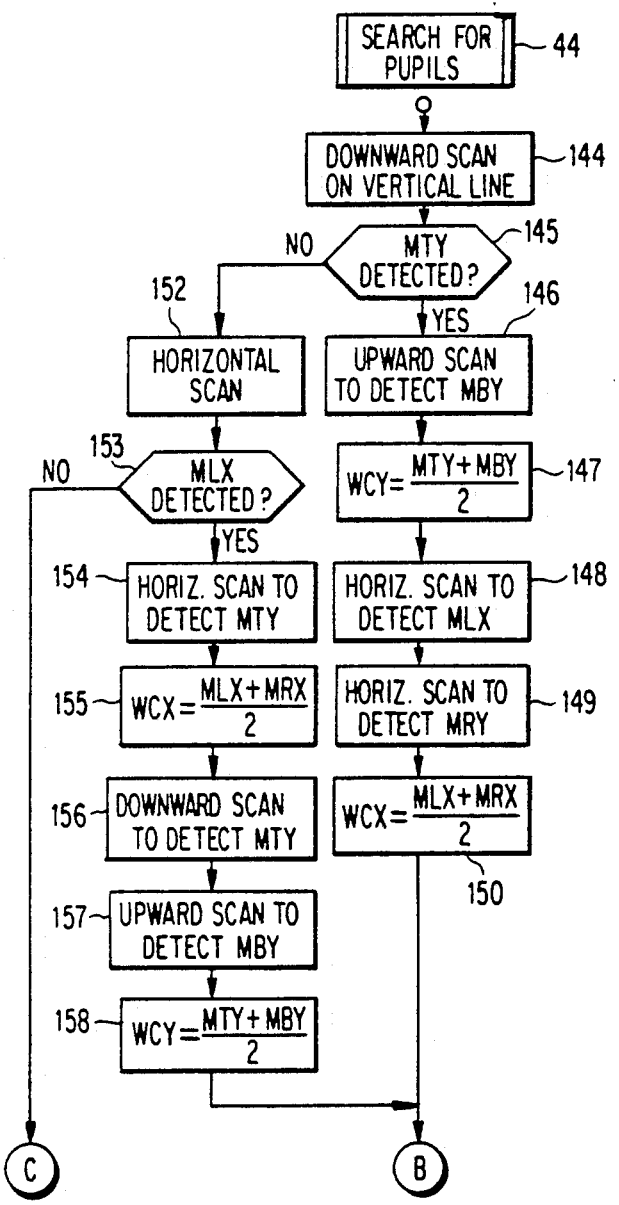
Figure 10B:
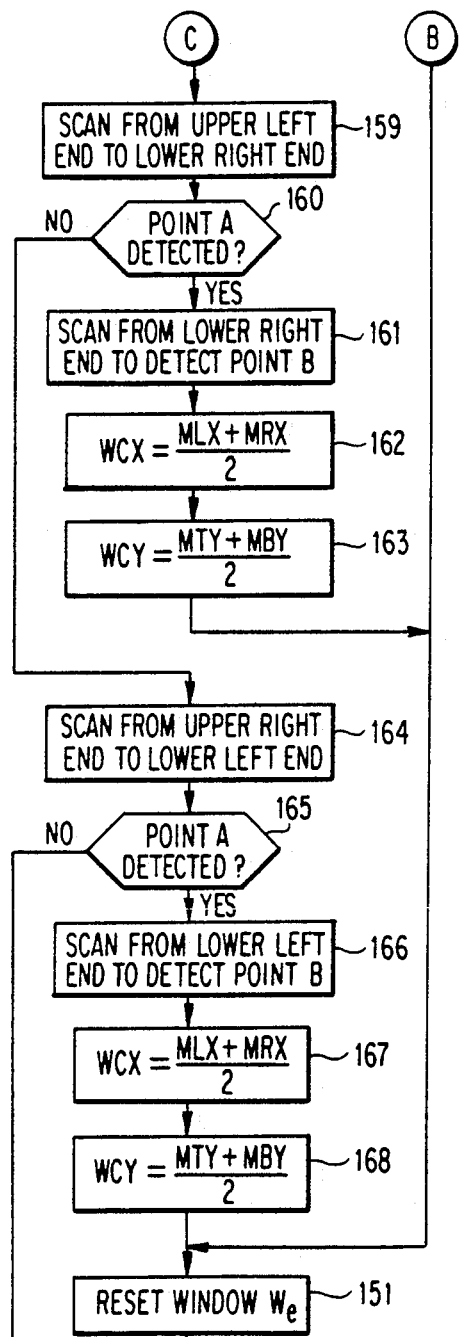

The subroutine 44 for search for pupils is now described by referring to FIGS. 10a and 10b. At step 41, data originating from the region of the window $W_e$ is digitized, using the threshold value $TH_e$. Data obtained from the region of the window $W_m$ is digitized, using the threshold value $TH_m$ determined in the subroutine 36. Data collected from region 1 within the other region is digitized, employing the threshold value $TH_{fr}$. Data gathered from region 2 is digitized, using the threshold value $TH_{fm}$. Data derived from region 3 is digitized by the use of the threshold value $TH_{fL}$. The single frame of image data digitized in this way is written to the memory 11.

Figure 15A:
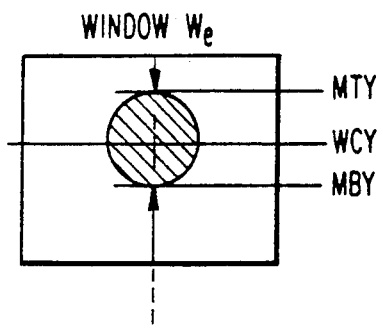
FIGS. 15a, 15b, 15c, 15d, 15e, 15f, and 15g are plan views of window regions $W_e$ formed for searching for pupils and detected pupils.
Figure 15B:
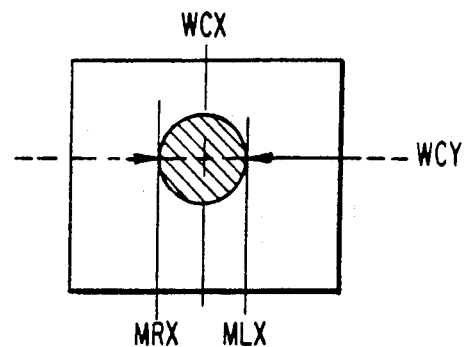
Figure 15C:
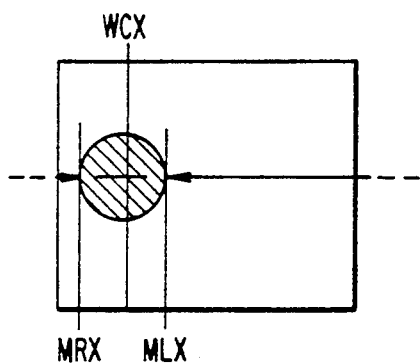
Figure 15D:
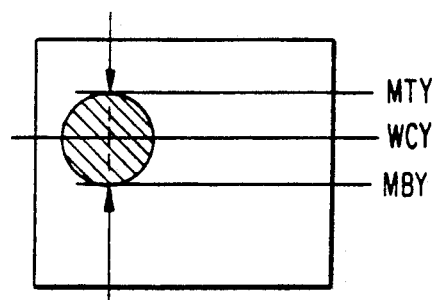

Control proceeds to step 44 for search for pupils. The microprocessor 6 sets the scanning region for reading an image to the region of the window $W_e$ stored in the memory. Data on the X coordinate of the center of the window $W_e$ is vertically downwardly scanned from $Y=0$ to $Y=255$, i.e., data is read from the memory 11. The number of successive black pixels is counted. If the total count reaches a given number, it follows that the upper end MTY (FIG. 15a) of a pupil has been detected (steps 144, 145). The Y address MTY is stored in the memory. Then, an upward scan is made without changing the X coordinate. The number of successive black pixels is counted. If the total count reaches a given number, it follows that the lower end MBY of a pupil is detected. The Y address MBY is stored in the memory (step 146). The intermediate point WCY between the upper end and the lower end is calculated (step 147). Then, the Y coordinate is set to WCY, and a horizontal scan is made from right to left to detect the right end MRX of the pupil (FIG. 15b). The X address of the right end is stored in the memory (step 148). Thereafter, a horizontal scan is made from left to right to detect the left end MXL of the pupil (FIG. 15b). The X address MLX of the left end is stored in the memory (step 149). The intermediate point WCX between the left end and the right end in the horizontal direction is calculated (step 150). The point given by coordinates WCX and WCY is temporarily regarded as the center of the pupil. A new window $W_e$ is formed around this center, thus updating the window $W_e$ (step 151). The new window $W_e$ determines the scanning range used for the next detection of a pupil. Control then proceeds to the next subroutine 49.

If the detection of the upper end of a pupil made at step 144 ends in failure because the pupil is located to the left or to the right of the center of the window, the horizontal line passing through the center of the window $W_e$ is scanned from right to left to detect the right end MRX of a given number of successive black pixels (FIG. 15c) (step 152). If it is successfully detected, a scan is made from left to right to detect the left end MLX (FIG. 15c) (step 154). The intermediate point WCX between the right end and the left end is calculated (step 155). Then, a scan is made from the upper end downwardly at the position X=WCX to detect the upper end MTY (FIG. 15d) (step 156). A scan is made from the lower end to detect the lower end MBY (step 157). The intermediate point WCY between the upper end and the lower end is calculated (step 158). The point given by the obtained coordinates WCX, WCY is temporarily regarded as the center of the pupil. A new window $W_e$ is formed around this center, thus updating the window $W_e$. Control then proceeds to the next subroutine 49.

Figure 15E:
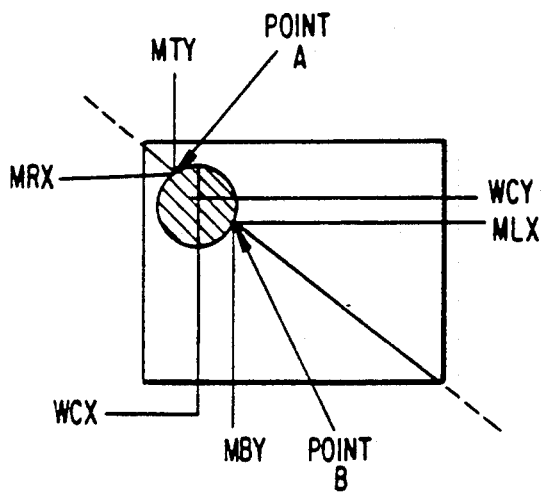

If the upper end MTY cannot be detected at step 144, and if MRY cannot be detected at step 152, then control goes to step 159 (FIG. 10b), where binary-coded data is scanned from the upper left corner of the window $W_e$ toward the lower right corner. In particular, as shown in FIG. 15e, the address at which binary data is started to be read from the memory 11 is located at the upper left corner of the window $W_e$. Then, the X and Y addresses are successively increased in increments of m and n, respectively. Point A located to the right of the upper end of the pupil is detected, and the address (MRX, MTY) is stored in the memory (step 159). The binary data is scanned from the lower right corner of the, window $W_e$ toward the upper left corner. The starting address is located at the lower right corner of the window $W_e$. The X and Y addresses are decreased in decrements of m and n, respectively, to detect point B located to the left of the bottom of the pupil. The addresses (MRX, MBY) are stored in the memory (step 161). The intermediate point (WCX, WCY) between the detected addresses is calculated (steps 162, 163) and stored in the memory. The calculated point (WCX, WCY) is temporarily regarded as the center of the pupil. A new window $W_e$ is formed about this center, thus updating the window $W_e$. Control then goes to the next subroutine 49.

Figure 15F:
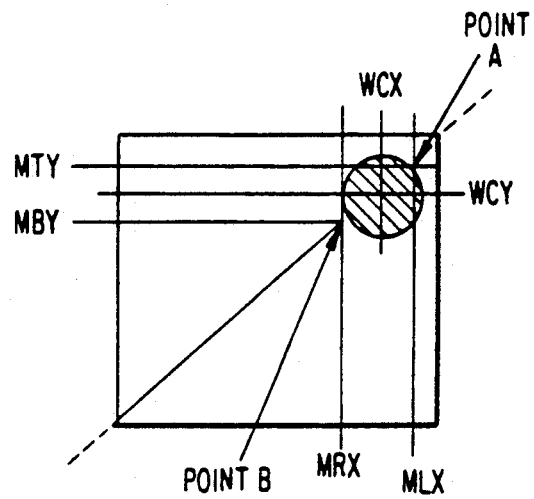
Figure 15G:
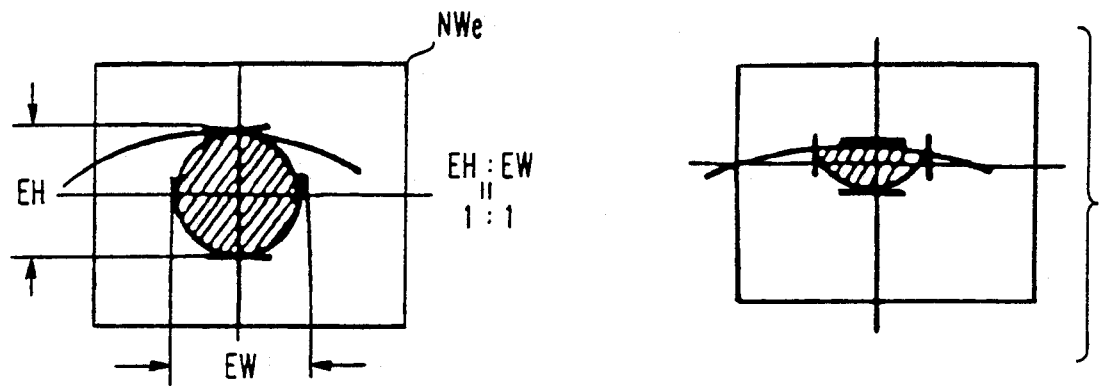

If the upper end MTY cannot be detected at step 144, if the X address MRX cannot be detected at step 152, and if the point A cannot be detected at step 159, then control goes to step 164, where binary data is scanned from the upper right corner of the window $W_e$ to the lower left corner. Specifically, as shown in FIG. 15f, the address at which binary data is started to be read from the memory 11 is placed at the upper right corner of the window $W_e$. Then, the X address is decreased in decrements of m, and Y address is increased in increments of n. The point A located to the left of the upper end of the pupil is detected. The address (MRX, MTY) is stored in the memory (step 164). Subsequently, binary data is scanned from the lower left corner of the window $W_e$ toward the upper right corner. The starting address is placed at the lower left corner of the window $W_e$. The X address is increased in increments of m, and the Y address is decreased in decrements of n to detect the point B located to the right of the lower end of the pupil. The address (MLX, MBY) is stored in the memory (step 166). The intermediate point (WCX, WCY) between the detected addresses is calculated (steps 167, 168) and stored in the memory. The point given by the coordinates WCY and WCX is temporarily regarded as the center of the pupil. A new window $W_e$ is calculated around this center, thus updating the window (step 151). Then, control goes to the next subroutine 49.

If no pupil can be detected at any of steps 144, 152, 159, 165, then control proceeds to the subroutine (ERP2) (FIG. 2) for error processing 2.

The subroutine 44 for search for pupil is executed as described thus far. The subroutine 51 (FIG. 2) for search for mouth which is not illustrated in the flowchart is executed in the same way as in the subroutine 44 for search for eye, based on the preset window $W_m$. Thus, the center of the mouth is detected, and the memory is updated. The window $W_m$ is reset.

Figure 11A:
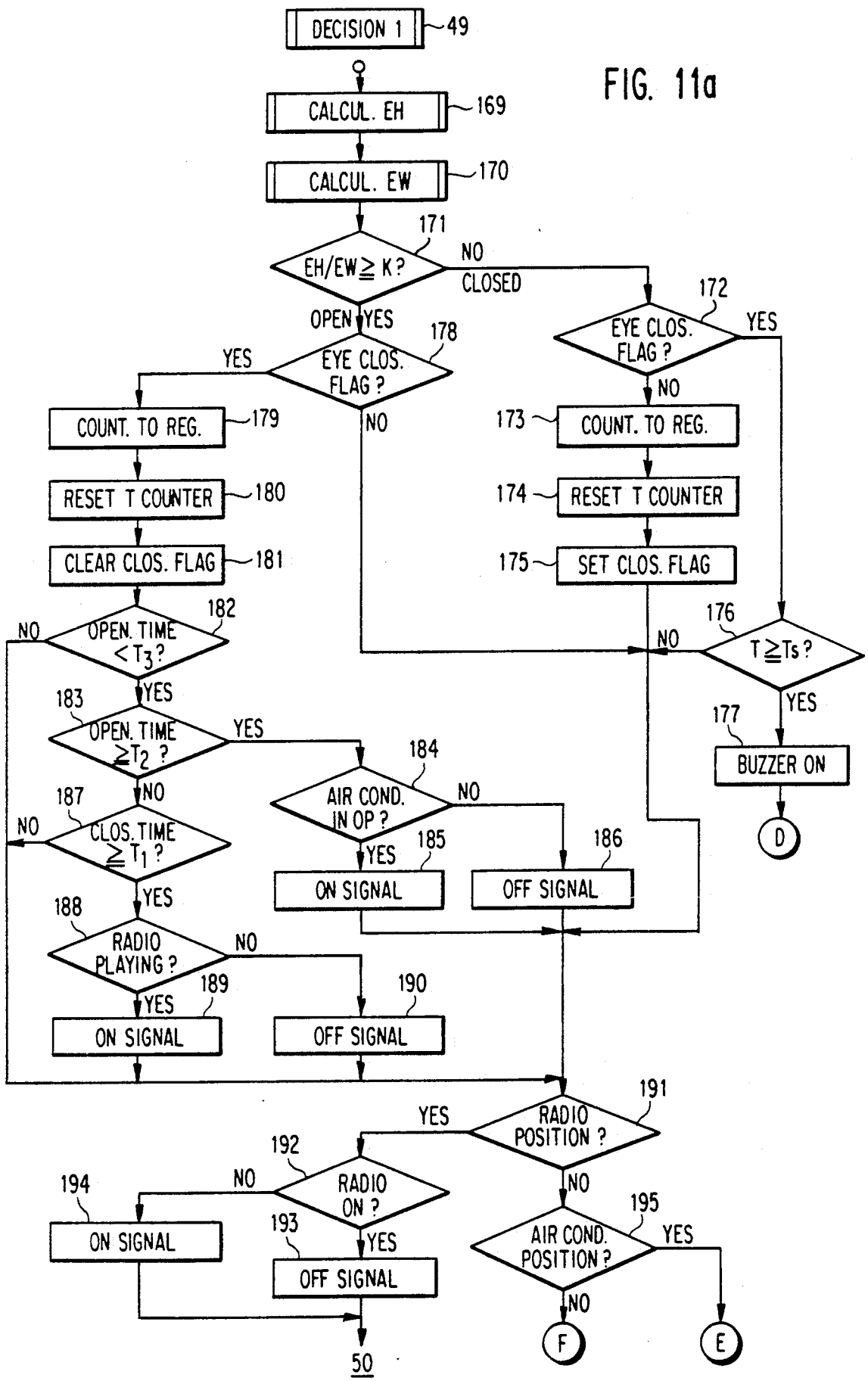
Figure 11B:
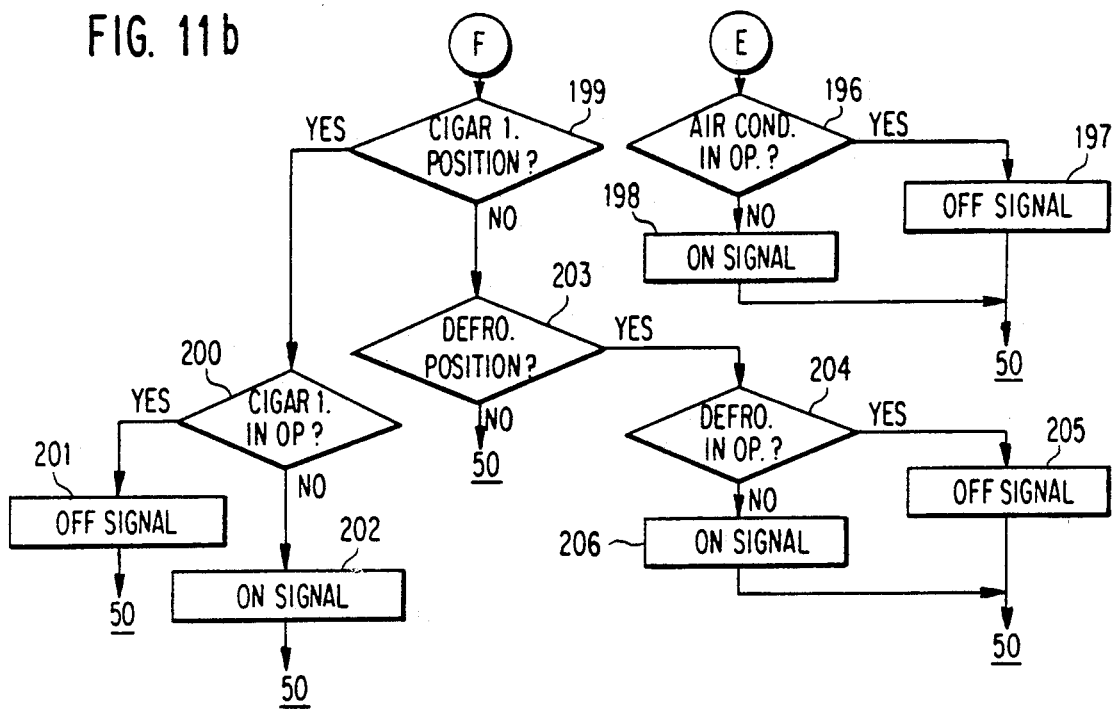

Decision 1 of the subroutine 49 illustrated in FIG. 2 is illustrated in FIGS. 11a and 11b. Decision 1 is made to detect the opening and closing pattern of an eye and the position of a moved pupil and also to deliver data (step 54 in FIG. 2) according to the results of the detection. More specifically, if control goes to subroutine 49, the microprocessor 6 instructs the microprocessor 8 to calculate the vertical diameter EH of the pupil (step 169). Since the center (WCX, WCY) of the pupil which was temporarily determined in the subroutine 44 for search for pupil might be incorrect, the microprocessor 6 forms a window $NW_e$ narrower than the window $W_e$ around the center (WCX, WCY). The window $NW_e$ is rectangular and circumscribed about a circle having a radius equal to the diameter D of the pupil. The center of the window $NW_e$ is located at the point (WCX, WCY). Binary data derived from this region is read from the frame memory 11 and fed to the microprocessor 8. The microprocessor 8 vertically scans the binary data obtained from the window $NW_e$, from the right end of the window $NW_e$ to count the number of successive black pixels. After completing the vertical scan in the range of the window $NW_e$, the total count is compared with the held maximum number of successive black pixels. If the total count is larger, the total count is stored as the maximum number, whereby the register is updated. Then, the position at which the vertical scan is made is shifted one pixel to the left, and the number of successive black pixels is counted in the same manner. If the total count becomes less than the maximum number held in the register, this maximum number is regarded as the vertical diameter EH of the pupil and stored in the memory. Also, the line address $NE_x$ is stored. Thereafter, the microprocessor 8 calculates the lateral diameter EW of the pupil (step 170).

More specifically, the microprocessor 8 horizontally scans the already received binary data about the window $NW_e$, from the upper end of the window $NW_e$ to count the number of successive black pixels. After completing the horizontal scan in the range of the window $NW_e$, the total count is compared with the held maximum number of successive black pixels. If the total count is larger, the total count is stored as the maximum number to thereby update the register. Then, the position at which the horizontal scan is made is shifted one pixel downward, and the number of successive black pixels is counted in the same manner. If the total count becomes smaller than the maximum number held in the register, this maximum number is regarded as the lateral diameter EW of the pupil and stored in the memory. Also, the line address $NE_y$ is stored. After calculating EH/EW, the microprocessor 8 supplies EH/EW, $NE_x$, and $NE_y$ to the microprocessor 6.

Upon reaching these values, the microprocessor 6 converts $NE_x$ and $NE_y$ into addresses in a frame of image. The converted addresses are used as the coordinates WCX, WCY of the center of the pupil and stored in the memory, thus updating it. Correspondingly, the window $W_e$ is replaced by a new window formed around this center. Then, the ratio EH/EW is compared with a constant K (step 171). If the ratio is larger, then the eye is judged to be open. If the ratio is smaller, the eye is judged to be closed. If the eye is open, the setting of an eye closure flag is checked (step 178). If it is set, it means that the eye was closed at the time of the previous execution of this step but is open now. A T counter measures the time for which the eye is closed. The total count obtained by the T counter is transferred to an eye closure time register to read the time (step 179). The T counter is reset to measure the time for which the eye is open (step 180). Then, the eye closure flag is reset (step 181). If the eye closure flag is reset (step 178), it means that the eye was open at the time of the immediately previous detection. Control goes directly to step 191.

If the result of the decision made at step 171 is that the eye is closed, the setting of the eye closure flag is checked (step 172). If it is reset, it means that the eye was open at the time of the immediately previous detection but closed this time. The contents of the T counter that measures the time for which the eye is open are transferred to an eye opening time register to read the time (step 173). The T counter is reset to measure the time for which the eye is closed (step 174). The eye closure flag is set (step 175). If the eye closure flag is set (step 172), it means that the eye was closed at the time of the immediately previous detection, the T counter is measuring the eye closure time, and the eye is closed this time. In order to perform a check to see whether the driver is taking a nap, the total count T obtained by the T counter is compared with a fixed reference value $T_s$ (step 176). If T is equal to or larger than $T_s$, there is a possibility of a nap. The buzzer controller 30 is operated (step 177). Then, control returns to the subroutine (IPD) (FIG. 2) for check on input mode. If both the mode-indicating switches 5E and 5M are open, control goes to step 4, where the buzzer controller 30 is operated. If the driver wants to stop the buzzer, he or she temporarily opens the switches 5E and 5M.

When the eye was opened this time (steps 171–178 to 181), the T counter is measuring the time for which the eye keeps open, since the eye was opened this time. The contents of the eye opening time register indicate the time for which the eye was open previous time. The contents of the register are compared with a time $T_3$ which is slightly shorter than the interval at which the driver blinks normally (step 182). If the previously measured time is shorter than $T_3$, it follows that the driver blinked intentionally. Then, the eye closure time immediately previous to the present opening of the eye is compared with a time $T_2$ which is considerably longer than the eye closure time of a natural blink (step 183). If the immediately previous eye closure time is in excess of $T_2$, it follows that the eye was consciously closed for a relatively long time. In this case, the air conditioner is controlled. For this purpose, step 184 and the subsequent steps are carried out to set data used for controlling the air conditioner. If the time is shorter than $T_2$, the eye closure time immediately previous to the present opening of the eye is compared with a time $T_1$ that is slightly larger than the eye closure time of a natural blink (step 187). If the time is longer than $T_1$, it means that the eye was consciously closed for a relatively long time. In this case, the radio set is played. For this purpose, step 188 and the subsequent steps are carried out to set data used to play the radio set.

If the previous eye opening time is shorter than $T_3$ (step 182), then the movement of the eye is judged to be a natural blink. If the previous eye closure time is shorter than $T_1$, the movement of the eye is taken also as natural blink. In either case, control proceeds to step 191. Note that the eye closure time of a natural blink $< T_1 < T_s < T_3 <$ interval at which the driver blinks normally.

If a conscious blink is detected, needing operation of the air conditioner (steps 182, 183, 184), then that signal of the signals previously delivered to the interface 14 which is assigned to the air conditioner controller 21 is checked to see whether it is an ON signal. If so, data for turning off the air conditioner is held in the output register (step 185). If the signal is an OFF signal, data for turning on the air conditioner is held in the register (step 186). If a conscious blink is detected, requiring playing of the radio set (steps 182, 183, 187, 188), then that signal of the signals now delivered to the interface 14 which is assigned to the ratio controller 20 is checked. If it is an ON signal, data for turning off the radio set is held in the output register (step 189). If it is an OFF signal, data for turning on the radio set is held in the register (step 190). The data held in the output register is sent to the interface 14 when the output routine (step 54)(FIG. 2) is carried out as described later.

If the pupil is detected correctly at steps 169 and 170, the microprocessor 6 uses the updated center (WCX, WCY) of the pupil and the initial position (ECX, ECY) of the center of the pupil to calculate a vector. The initial position was detected in the subroutine 33 and has been stored in the memory. The vector has a magnitude given by a standard deviation as well as a direction. The starting point of the vector is located at the initial position (ECX, ECY) and the end point is situated at the center (WCX, WCY). The calculated vector is compared with four vector ranges (steps 191, 195, 199, 203). The first range is assigned to a radio set position previously stored in the memory. The second range is assigned to an air conditioner position. The third range is assigned to a cigar lighter position. The fourth range is assigned to a position for the control knob of the defroster.

If the calculated vector lies within the vector range assigned to the radio set position, then that signal of the signals delivered to the interface 14 which is assigned to the radio set is checked (step 192). If it is an ON signal, the bits which are delivered from the output register and assigned to the radio set are so modified that the ON signal is changed to an OFF signal (step 193). If the checked signal is an OFF signal, then it is varied to an ON signal (step 194). If the calculated vector lies within the vector range assigned to the air conditioner position, then that signal of the signals delivered to the interface 14 which is assigned to the air conditioner position is checked (step 196). If it is an ON signal, the data which is held in the output register and assigned to the air conditioner is changed such that the ON signal is changed to an OFF signal (step 197). If the checked signal is an OFF signal, the data which is held in the output register and assigned to the air conditioner is altered such that the OFF signal is changed to an ON signal (step 198). If the calculated vector lies in the vector range assigned to the cigar lighter position, the output signal from the interface 14 which is assigned to the cigar lighter is checked (step 200). If it is an ON signal, the data that is held in the output register and assigned to the cigar lighter is modified in such a way that the signal is changed to an OFF signal (step 201). If the checked signal is an OFF signal, it is changed to an ON signal (step 202). If the calculated vector lies within the vector range assigned to the defroster position, then the output signal from the interface 14 which is assigned to the defroster is checked (step 204). If it is an ON signal, the bits which are held in the output register and assigned to the defroster are so altered that the checked signal is changed to an OFF signal (step 205). If the checked signal is an OFF signal, it is changed to an ON signal (step 206). If data is stored in the output register in this way, control goes to the next step 50. If the calculated vector lies within none of the various vector ranges, it is decided that any instruction was not issued by movement of the eyes or the pupils. Also it this case, control proceeds to step 50.

Figure 12C:
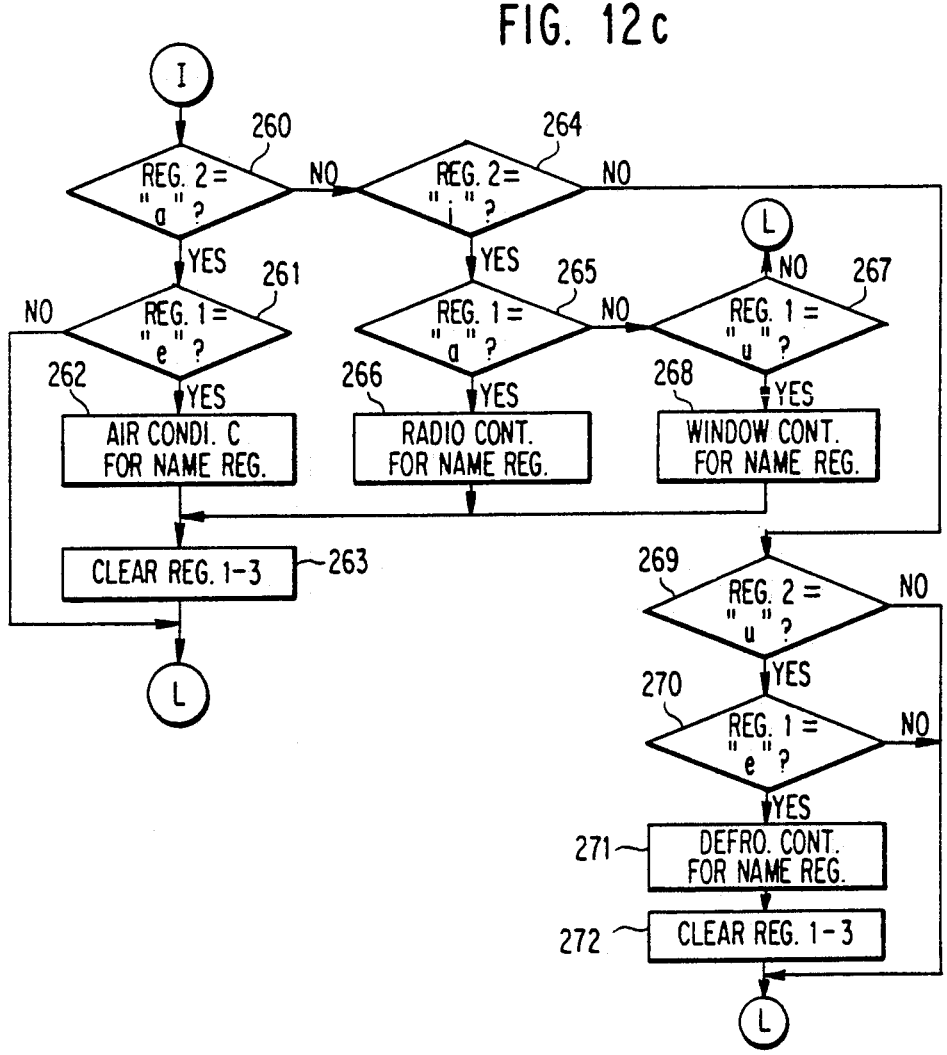
Figure 12A:
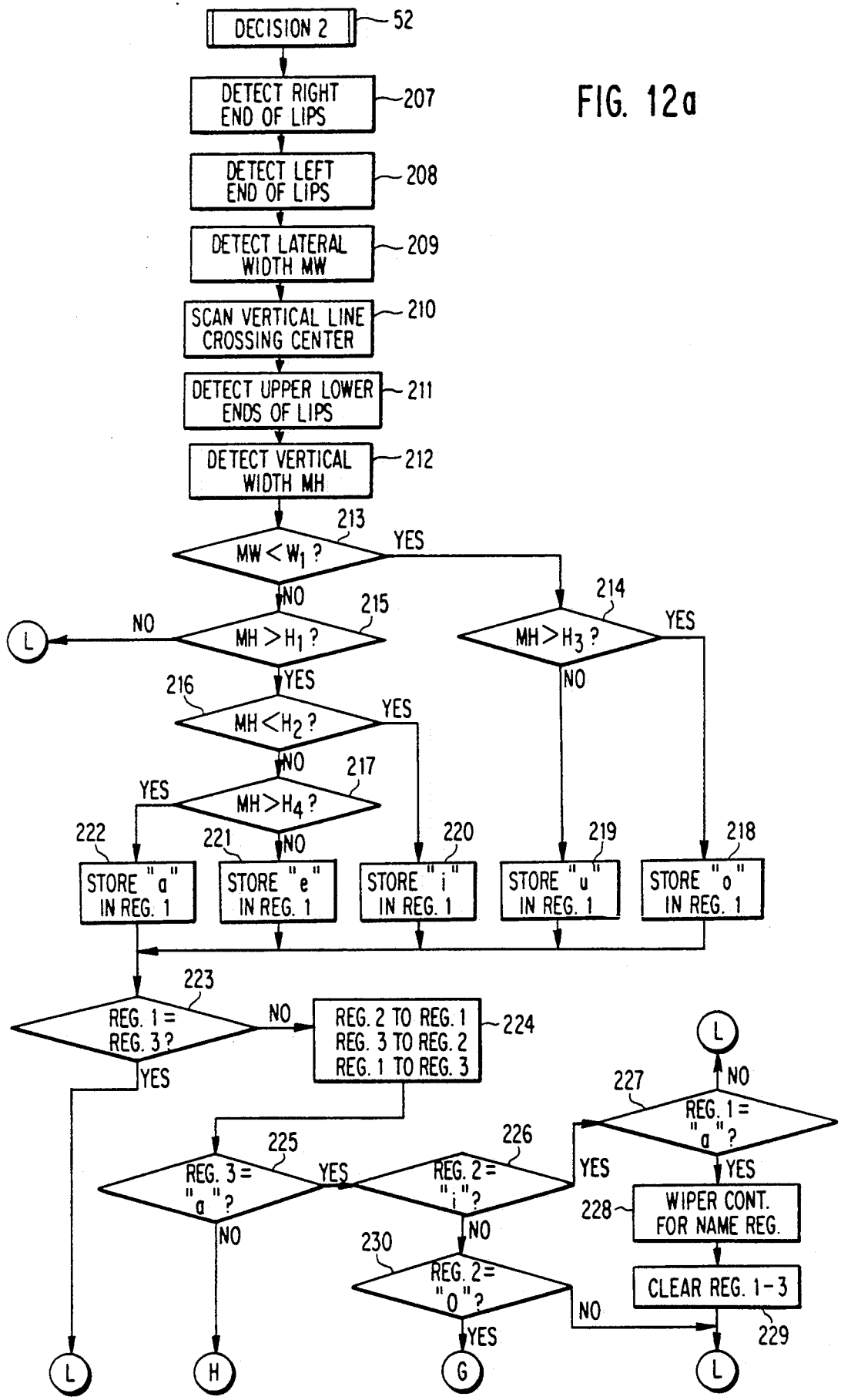
Figure 12B:
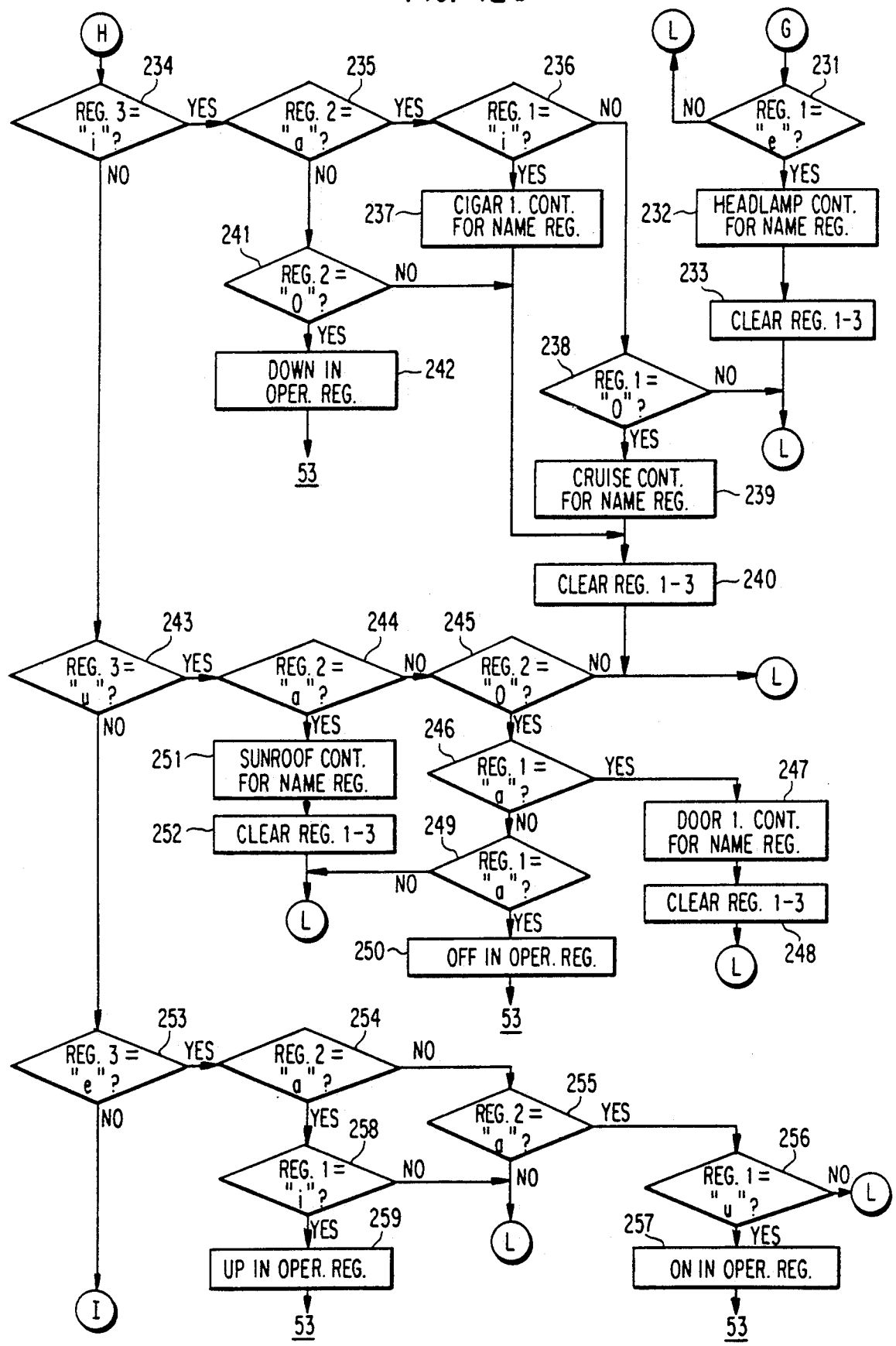

The "decision 1" subroutine of step 49 illustrated in FIG. 2 has been described thus far. The "decision 2" subroutine of step 52 is next described by referring to FIGS. 12a–12c.

After control exits from the "search for mouth" subroutine of step 51, control goes to "decision 2" subroutine (step 52), the "search for mouth" subroutine being similar to the "search for eye" subroutine (step 44). The microprocessor 6 reads the binary data on the window $W_m$ from the memory 11 and sends it to the microprocessor 8 to detect the lateral width MW and the vertical width MH of the mouth (FIG. 16a) (steps 207–212). The window $W_m$ was updated in the "search for mouth" subroutine (step 51). When the microprocessor 8 accepts the binary data on the window $W_m$, it sets the line direction to the vertical direction (Y direction). The first line is placed at the left end of the window $W_m$. The lines are updated from left to right. Each time a line is updated, the run counter is cleared. Also, each time a white pixel is detected, the run counter is cleared. The number of successive black pixels, i.e., black run length, is counted for each line. If the black run length reaches a given value, the X address of the line is regarded as indicating the right end of the mouth. The X address NMRX is stored in the memory (step 207). Then, the line address is made to indicate the right end of the window $W_m$. Subsequently, the line address is shifted to the left. The black run length of each vertical line is counted. If the total count reaches a given value, the line is regarded as lying at the left end of the mouth. The X address NMLX is stored in the memory (step 208). The lateral width of the mouth is calculated according to the formula, MW=NMLX−NMRX, and stored in the memory (step 209). Then, the X address is set to the horizontally central point of the mouth, given by NMRX+(NMLX−NMRX)/2. The binary image data on the vertical line having the X address is scanned from the upper end of the window $W_m$ toward the lower end. Whenever a white pixel is detected, the run counter is cleared. Whenever a black pixel is detected, the run counter is incremented. If the resulting black run length reaches a given value, it follows that the upper end of the lips has been detected. The Y address NMTY is stored in the memory (steps 210, 211). The binary image data is scanned from the lower end of the window $W_m$, and the black run length is measured. If the total count reaches a given value, it is found that the lower end of the lips has been detected. The Y address NMBY is stored in the memory (steps 210, 211). Then, the vertical width is calculated according to the formula, MH=NMBY−NMTY, and stored in the memory. The values NW, MH, NMRX+(NMLX−NMRX)/2, and NMTY+(NMBY−NMTY)/2 are sent to the microprocessor 6 which converts the coordinates NMRX+(NMLX−NMRX)/2 and NMTY+(NMBY−NMTY)/2 of the center of the mouth in the window $W_m$ into coordinates MCX and MCY in the frame. The converted coordinates are stored in the memory. The window $W_m$ is reset around the coordinates MCX, MCY. The width MW is compared with a fixed value $W_1$, and the width MH is compared with $H_1$, $H_2$, $H_3$, and $H_4$ to judge which of the vowels "a", "i", "u", "e", "o" did the mouth pronounced, from the shape of the mouth (steps 213–217). If the pronounced vowel is "a", "i", "u", "e", or "o", then that indicating that vowel is stored in a register I (steps 218–222).

Figure 16B:
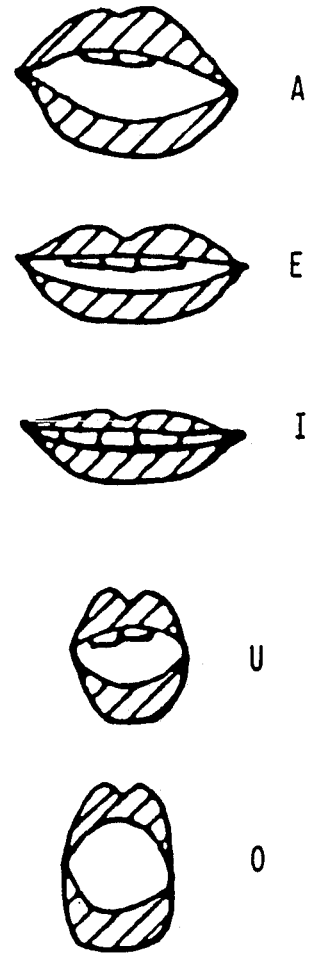
FIG. 16b is a plan view of a mouth, for showing various shapes of the mouth taken to pronounce vowels.

As shown in FIG. 16b, the vowels "a", "i", "u", "e", and "o" can be distinguished from each other by their lateral widths and vertical widths. The aforementioned reference values including $W_1$, $H_1$–$H_4$ are compared with the widths MW, MH to specify these vowels.

To understand the manner in which the change in the pattern of shape of the pronouncing mouth is judged, the names given to the electrical devices 20–29 shown in FIG. 1a are shown in Table 3.

TABLE 3

| device | name | vowel (in Japanese) | | | | | | | |
|---|---|---|---|---|---|---|---|---|---|
| 20 | radio | | | | | a | i | o | |
| 21 | air conditioner | | | | | e | a | o | |
| 22 | cruise control | o | o | o | o | a | i | u | |
| 23 | door lock | | | | o | a | o | u | |
| 24 | sunroof | | | | | a | u | u | |
| 25 | windows | | | | u | i | o | u | |
| 26 | wipers | | | | a | i | a | | |
| 27 | cigar lighter | | | | i | a | a | i | a |
| 28 | headlamps | | | | e | o | a | i | o |
| 29 | defroster | | | | e | u | o | u | a |
| instructions for operations | | | | | | | | | |
| ON | move | | | | u | o | e | | |
| OFF | stop | | | | u | o | u | | |
| UP | open | | | | i | a | e | | |
| DOWN | close | | | | o | i | | | |
| number given to register storing data about detected mouth shape | | | | | 1 | 2 | 3 | | |

We now take the control over the radio set for example. In this example, "radio" (name) and "move" (instruction for operation) are pronounced in this order. In terms of vowels, "aio" and "ueo" are pronounced in Japanese. These pronounced vowels are detected and stored in registers 1, 2, 3, respectively. Each time a vowel is detected (steps 213–222)(FIG. 12a), data indicating the vowel is stored in register I. The contents of register I are compared with register 3 (step 223). If both agree, the shape of the mouth is maintained and, therefore, control directly proceeds to the output subroutine 54 (FIG. 2). If both do not agree, the shape of the mouth changed. In this case, the contents of register 2 are transferred to register 1, and the contents of register 3 are transferred to register 2. The contents of register 3 are stored in register I (step 224). That is, data obtained by detecting the latest shape of the mouth differing from the shape detected immediately previously is stored in register 3. Thus, data is circulated among the registers. When the driver pronounced "radio" and the last vowel "o" is detected, data about the vowels surrounded by ruled lines in Table 3 are stored in registers 1–3. It is impossible to know when data about the shapes of the mouth pronouncing vowels is fully stored in registers 1–3. Therefore, each time data about a vowel is stored in register 3, decisions are made to ascertain whether data about the shapes of the mouth pronouncing the names and the instructions shown in Table 3 is stored in registers 1–3 (steps 225–272). That is, checks are made to determine to which of the names and instructions listed in Table 3 do the contents of registers 1–3, or the pattern of the shapes of the mouth assumed successively, correspond.

If any correspondence takes place, e.g., if data on "o", data on "i", data on "a" are stored in registers 3, 2, 1, respectively, as shown in the column of "radio", then steps 225, 234, 243, 253, 260, 264, 265 are executed to store data indicating "radio" in a NAME register (step 266). If the contents of registers 1–3 are data shown in the column of "ON" shown in Table 3, then steps 225, 234, 243, 253, 254, 255 are carried out to store "ON" in an operation register (step 257). When data about an instruction for an operation (ON, OFF, UP, or DOWN)

is stored in the operation register (step 242, 250, 257, or 259), registers 1-3 are cleared. Control then goes to step 53, where the IPDF counter counting the number of errors is cleared. Then, control proceeds to the output subroutine (step 54), where data delivered from the output register is changed to data that indicates the operation of the radio controller 20, for example. In this operation, the contents of the NAME register indicate the radio controller. The contents of an operation instruction register indicate operation. The contents of the output register are sent to the interface 14.

Driver's operations and operations performed in the above example are now described briefly.

(1) When the switch 5E and 5M are both open, if the driver closes one of these two switches, then the light 4 is lit up at a normal duty cycle, and the camera 3 is turned on. After a lapse of a given time, an image of the driver's face is taken and data about the image of one frame is written to the memory 13. A brightness histogram is created and compared with a predetermined value to judge whether the brightness is appropriate. Then, the brightness of the light is adjusted. Each time the brightness of the light is changed, new data about one frame of image is written to the memory 13 (steps 2-12).

(2) After completing the adjustment of the brightness, a simple gradation histogram about the given region $H_{tp}$ is created from one frame of image data stored in the memory 13. The threshold value $TH_h$ which separates data about the hair from data about the background is determined (step 13). The image data is digitized, using the threshold value, to detect the right end position ARX of the head, the left end position ALX, and the front end position ATY (step 15).

(3) The face region which is located between the left end and the right end of the head and below the front end position ATY is divided into a left half and a right half. For these valves, the threshold values $TH_{fr}$ (right half) and $TH_{fL}$ are determined from the simple gradation histogram. The face region is equally divided into horizontally adjacent regions 1, 2, 3 (FIG. 4c). The threshold value $TH_{fr}$ is selected for region 1. The larger one of $TH_{fr}$ and $TH_{fL}$ is selected as $TH_{fm}$ for region 2. The threshold value $TH_{fL}$ is selected for region 3 (step 20). Image data derived from regions 1-3 of the face is digitized, using these threshold values, to detect the position HTY of the upper end of the forehead, i.e., the boundary between the forehead and the hair, the left end HLX, and the right HRX (step 22). The width of the forehead is calculated according to the formula, HW = HLX − HRX.

(4) A differential gradation histogram is created from a region $S_d$ (FIG. 4d) which extends a distance of HW downward from the upper end HTY of the forehead. The lateral extent of the region $S_d$ is the right half of the width HW of the forehead upper end HTY. The threshold value $TH_e$ used for detection of the right eye is determined from the histogram (subroutine 25). The gray-level data derived from the region $S_d$ is digitized, and the right eye region E (FIG. 4f) is detected (step 27). The central position of the right pupil is detected (step 33). A small window $W_e$ is formed around the central position.

(5) The left eye region and the central position of the left pupil are detected (LED) in the same manner as in the process (4) above.

(6) The outer ends of both eyebrows are found from the face region (step 35). A detected mouth region is determined. The threshold value $TH_m$ used for the mouth region is determined from a differential gradation histogram (step 36). The central position of the mouth is detected (steps 37, 38). A small window $W_m$ is formed around this central position.

(7) A nostril detection region is formed in the same manner as in the process (6) to detect the central position of the region containing the two nostrils (subroutine NOD).

(8) The shapes and relative positions of elements of the face are calculated from the positions and regions detected in processes (4)-(7). The obtained data is normalized with the distance EW between both pupils. The degrees of approximation of each normalized data item to the statistical data already stored in the ROM 9 are calculated as degrees of similarity $F_1-F_{14}$. The statistical data includes mean values M and standard deviations $\sigma$. The degrees of certitude $F_{21}-F_{27}$ of the shapes, or geometrical features, and the relative positions of the elements are calculated from the degrees of similarity. Then the degrees of certitude $F_{28}-F_{31}$ of existence of the elements are calculated from the degrees of certitude. The degree of certitude $F_{32}$ to which the face is detected is calculated from the degrees of certitude of existence. If the degree certitude $F_{32}$ exceeds a predetermined value, then the face and the elements, i.e., the pupils, the mouth, and the nose, are judged to be correctly detected. If the degree does not exceed the value, the detection is judged to be unsuccessful. In this case, the processes (1)-(7) are executed and then control goes to the process (8).

(9) If the face and the elements are judged to be detected in the process (8), then whenever a new image is read, each portion of the image is digitized, using the threshold values $TH_e$ and $TH_m$ for the regions of the windows $W_e$ and $W_m$, respectively. The pupils and the mouth are detected in the regions of the windows $W_e$ and $W_m$. If they are successfully detected, the positions of the windows $W_e$ and $W_m$ are changed according to the central positions of the detected pupils and mouth. The changes in the conditions of the pupils and the mouth are detected. The electrical devices are turned on or off or otherwise controlled according to the results of the detection. If the detection results in failure, a new image is read and digitized. The pupils and the mouth are detected only in the window regions $W_e$ and $W_m$. This series of operations for detecting them is repeated up to 8 times. If they cannot be detected in spite of 8 series of operations, the processes (1)-(8) are carried out to determine new threshold values $TH_e$, $TH_m$ and new windows $W_e$ and $W_m$.

(10) When only the mode switch 5E is closed, the search for the pupils, detection of the opening and closing pattern of the eyes, and detection of the changes in the position are repeated. If closure of the eyes persists longer than $T_s$, the buzzer is operated, since there is a possibility of a nap. When the switch 5E is opened, the operation of the buzzer is stopped. After the eyes open for a time shorter than the interval $T_3$ of natural blinks, if closure of the eyes is detected for a time $T_1$ slightly longer than the eye closure time of a natural blink, then an instruction for turning on or off the radio set is issued. Subsequently, the radio set is turned on or off. When the radio set is playing, if this opening and closing pattern of the eyes is detected, the radio set is turned off. When the radio set is not playing, it is turned on.

After the eyes open for a time shorter than the interval $T_3$ of a natural blink, if closure of the eye is detected for a time $T_2$ considerably longer than the eye closure time of a natural blink, then an instruction for turning on or off the air conditioner is given. As such, the air conditioner is turned on or off. If the opening and closing pattern of the eyes is detected while the conditioner is operating, then it is turned off. When the conditioner is not operating, it is turned on.

A decision is made to see to which of the radio position, the air conditioner position, the cigar lighter position, and the defroster control knob position do the pupils face. When the result of the decision is that the pupils face to the radio position, if the radio set is playing, then it is turned off and if it is not operating, it is turned on. When the result of the decision is that the pupils face to the air conditioner position, if the conditioner is operating, it is turned off and if it is not operating, it is turned on. When the result of the decision is that the pupils face to the cigar lighter position, if the lighter is operated, it is turned off and if it is not operating, it is turned on. When the result of the decision is that the pupils face to the defroster control knob, if the defroster is operating, it is turned off and if it is not operating, it is turned on. When any one of these operations is completed, new image data is accepted. When it is found that the pupils face to none of the aforementioned positions, reading of new image data is immediately started. When the mode-indicating switch 5E is closed, the electrical devices are controlled according to the movement of the eyes in this way, the switch 5E acting also as a means specifying certain portions, or the pupils, to be detected.

(11) When only the mode switch 5M is closed, the operation for search for the mouth and the operation for detection of the pattern of change in the shape of the mouth are carried out. If the result of the previous detection of the pattern specifies any one of the electrical devices 20-29, and if the result of the subsequent detection of the pattern specifies an instruction for an operation, then the specified instruction is given to the specified electrical device.

During this process, only the shape of the mouth corresponding to the pronunciation of a vowel is detected to make the detection certain Whenever the shape of the mouth pronouncing a vowel is detected, the immediately previously detected shape is compared with the presently detected shape to detect the pattern of change in the shape. If both shapes agree, the presently detected shape is not accepted to avoid reading the same shape repeatedly. Some shapes taken by the mouth to pronounce vowels are assigned to each of the names of the electrical devices 20-29. Also, some shapes assumed by the mouth to pronounce vowels are assigned to each of the instructions for operations. The pattern of two or three shapes successively taken by the mouth to pronounce the vowels of any one of these names and instructions can be uniquely defined. Detected data indicating any one of the names of the electrical devices 20-29 is stored in the NAME register Detected data indicating an instruction for an operation is stored in the operation register. Each time an instruction for an operation is detected, the contents of the operation register are updated. Correspondingly, the electrical device specified by the contents of the NAME register is controlled (ON, OFF, UP, or DOWN) according to the contents of the operation register.

(12) When the mode switches 5E and 5M are both closed, the processes (1)-(8) are carried out. Then, the processes (10) and (11) are effected successively while executing the process (9). The data stored in the output register in the processes (10) and (11) is sent to the interface 14. If 8 successive series of operations for detection eventuate in failure, the series of processes is repeated from the process (1). Reading of an image, digitization of the image, the processes (9), (10), (11), and production of output signal are effected in this order repeatedly unless unsuccessful detection takes place. When the operation instruction detected in the process (10) differs from the operation instruction detected in the process (11) for the same electrical device, a control signal according to the result of the detection made in the process (11) is supplied to the electrical device. The instruction detected in the process (10) is issued according to the results of detection of the opening and closing pattern of the eyes and the positions of the eyes. The instruction detected in the process (11) is issued according to the pattern of the shapes successively taken by the mouth to pronounce vowels. That is, priority is given to the result of detection of the mouth. The mode-specifying switch 5M serves also as a means for specifying a detected object or control mode to which priority is given.

Since the above-described control operations are performed, after only the mode-specifying switch 5E has been closed, the driver can turn on and off the radio set, the air conditioner, the defroster, and the cigar lighter in a non-contact manner simply by opening or closing his or her eyes or turning the eyes to a desired electrical device without the need to move his or her hands, arms, or body.

After only the mode-specifying switch 5M has been closed, the driver can control a desired electrical device by moving his or her mouth either to actually pronounce the name of the device and an instruction for operating the device or as if to pronounce them. Since this can be achieved without the need to move the hands, the arms, or the body, no labor is required. Further, no mental concentration is necessitated, because neither the hands nor the line of sight is moved. Therefore, the automobile can be driven safely. Further, driving is made comfortable, and fatigue is reduced.

The driver can turn on and off various electrical devices on the vehicle with his eyes and mouth by closing both mode-specifying switches 5E and 5M.

In the above example, the mouth scanning region (the hatched region in FIG. 13j) is set, based on the eyebrows. This region can also be set, based on the upper end HTY of the forehead and the width HW in the same manner as in the case of detection of the eyebrows. Further, another method may be adopted. In particular, the head is first detected without detecting the forehead. Then, the eyebrows, the pupils, the nostrils, or combination thereof is detected. Finally, the mouth scanning region is set, based on the detected elements.

In the above example, a given region, or a face region (ATY-255, ARX-ALX) is divided into smaller neighboring regions, or the right half and the left half, of the face region as in the process (3). A gradation histogram is created for each smaller region. Threshold values are determined for the regions 1, 2, 3 of the given region, or face region, from the histograms. Image data is digitized, using the threshold values. A characteristic index HTY showing the boundary between the hair and the forehead is detected. In the digitized image of the face, gray levels change suddenly at this boundary. A region $S_d$ is set, based on the detected characteristic index (HTY) as in the process (4). A gradation histogram is created from the region $S_d$. Threshold values are calculated from the histogram. Gradation image data derived from the region $S_d$ is digitized, using the threshold values. Thus, the positions and/or the shape of certain small portions, or the pupils, of the face is detected.

To set threshold values, using a gradation histogram and digitization using the histogram are known in the field of object recognition image processing. These techniques are adequate to extract an object located in front of the background of a frame of image from the background when the gray levels in the frame vary. The aforementioned example makes use of these techniques. In addition, a given portion is divided into smaller portions. Such digitization is effected for each region. Consequently, the characteristic index (HTY) can be correctly detected if the object is illuminated nonuniformly.

The formation of the region $S_d$, based on the characteristic index HTY, the determination of the threshold values from the gradation histogram created from the region $S_d$, and the digitization using the threshold values similarly facilitate detection of a certain small portion. When a differential gradation histogram is utilized as in the above example, the definition of a given region $S_d$ including certain portions, or the pupils, of the detected object also makes it more appropriate to extract those portions such as the pupils which differ greatly in gray level from the surrounding portions, from the surrounding portions or the background within the certain region $S_d$ when the brightness of the light source varies. Hence, certain small portions such as the pupils can be detected with improved accuracy.

Accordingly, in the above example, a desired portion can be detected accurately if the object is illuminated nonuniformly or the brightness of the light itself varies. Since the control of the electrical devices is precise, a person or an object which may or may not be detected can turn on and off and otherwise control the electrical devices substantially without the need of operations requiring considerable labor and mental concentration, unlike the prior art system. Therefore, if the driver is a capable person, then more action is allowed. If the driver is not a capable person, then he or she can operate the electrical devices more skillfully. Because the detected subject can be an object or animal, automatic control that is not required to be monitored by a person is also permitted.

In the above example, the detection of the face is checked as in the process (8). That is, a check is performed to ascertain whether the obtained image is a human face or not. Only when it is judged to be a human face, the face is searched for the pupils and the mouth. Therefore, the positions and the changes in the shapes of the pupils and the mouth can be detected with accuracy. The possibility of erroneous control is quite low. A check for determining whether the face is detected is performed in the manner described below. The shapes and the relative positions of elements of the face are normalized and converted into degrees of similarity $F_1$-$F_{14}$ to reference values (M, $\sigma$) which are obtained by normalizing these statistical values of ordinary persons. The degrees of certitude $F_{21}$, $F_{23}$, $F_{26}$ of the elements and the degrees of certitude $F_{22}$, $F_{24}$, $F_{25}$, $F_{27}$ of the relative positions are calculated by combining the degrees of similarity. The degrees of certitude of the existence of the elements $F_{28}$, $F_{29}$, $F_{30}$, and $F_{31}$ are calculated by combining the degrees of certitude of the shapes and the degrees of certitude of the relative positions. The degree of certitude $F_{32}$ of detection of the face is calculated by combining these degrees of certitude of the existence. A check is done to see whether the detection of the face is correct, from the degree of certitude $F_{32}$. Therefore, the decision on whether the elements are detected correctly is automatically made, as well as the decision on whether the obtained image is a human face. Since the shapes and the relative positions of the elements are normalized with the space between the pupils, the decision on whether the face and the elements are detected correctly is not substantially affected by a change in the distance between the camera and the face.

In the above example, statistical values are used as the reference data for calculating the degrees of similarity of the elements of the face. The reference data may be obtained from a person which can be regarded as standard. A degree of similarity may be calculated by dividing the deviation from a reference value by a reference value and subtracting the quotient from 1.

The system shown in FIG. 1a may be provided with keys for entering reference values and also with a program for setting reference values. When the keys are operated, the program calculates parameters about the shapes of the elements of the face taken by the camera 3 and parameters for the relative positions. The calculated parameters are normalized and used as reference values.

When the automobile is running, the intensity of brightness on each portion of the face varies. The reference value-setting program is created, taking the variation into account. Specifically, whenever any one of the keys for entering reference values is operated, the program calculates the parameters for the shapes of the elements and the parameters for the relative positions and normalizes the parameters as described above. The normalized parameters are added to already accepted and normalized data to update the statistical values such as M, $\sigma$ of the data. The statistical values are used as reference values. In this case, the parameters for the shapes of the elements of the face and the parameters of the relative positions are determined for only one person, such as the owner of the vehicle, and under various conditions of light from outside the vehicle. The parameters are normalized, and statistics of the normalized parameters are used as reference values. These reference values show better adaptation than reference values which are statistical values based on data collected from many persons. Hence, the detection of the face can be checked more accurately.

The position-detecting means detects the positions of three or more elements, such as the right pupil, the left pupil, the nostrils, and the mouth, of an image such as a human face. The distance-detecting means detects the distances between the elements. The distances are normalized with the space between certain elements. Therefore, the normalized data indicating the distances between the elements are substantially independent of the distance between the camera means and the image. The similarity degree-detecting means compares the normalized data with reference values which are stored in the storage means and have been previously assigned to the elements of the image to produce data about the degrees of similarity of the detected elements to the elements of the reference image. The degrees of similarity indicate the degrees to which the positions of the elements of the optical image formed by the camera means bear resemblance to the positions of the elements of the reference image, or the normalized data about the distances between the elements. As the degrees of similarity of the elements increase, the optical image formed by the camera means approaches the reference image. The determining means determines whether the elements have been detected successfully, based on the data about the degrees of similarity. That is, if a high degree of similarity is obtained, then it is found that the image formed by the camera means approximates the reference image. Conversely, if a low degree of similarity is obtained, then the image formed by the camera means is judged to be different from the reference image.

Accordingly, where the elements such as the pupils and the mouth of an automobile driver's face, for example, are detected to turn on and off or otherwise control electrical devices installed on an automobile according to the shapes of the elements and the pattern of change in the shapes, the decision to determine whether the image formed by the camera means is the face or not can be made precisely. Therefore, the electrical devices can be controlled with reduced error. Especially, where the distance between the camera means and the driver's face change as encountered when the driver moves the seat forward or rearward, the pupils and the mouth can be detected correctly. The electrical devices can be controlled precisely according to the positions of the elements and the changes in the shapes.

What is claimed is:

1. A system for recognizing an image of a vehicle driver's face, comprising:

camera means which converts optical information obtained from a first facial image into an electrical signal;

position-detecting means for detecting three or more elements of the first facial image and their positions according to the electrical signal;

distance-detecting means for detecting the distances between the detected elements;

normalizing means for normalizing data about the detected distances with the distance between given two of the detected elements;

storage means which hold reference values previously assigned to the elements of the first facial image, said reference values being standard values previously determined from a plurality of facial images similar to said first facial image;

similarity degree-calculating means which compares the normalized data about the distances with the reference values of similarity to the elements and produces data about the degrees of a reference image by employing a weighting system; and determining means which determines whether the facial image has been successfully detected, from the data about the degrees of similarity of the detected elements, wherein, after the determining means determines that the first facial image has been successfully detected, a second facial image is read, and changes in conditions of the second facial image are detected by comparison to the first facial image, and that electrical devices are controlled based on the detected changes in conditions.

* * * * *